US012646051B2

(12) United States Patent
     Mashkevich

(10) Patent No.: US 12,646,051 B2
(45) Date of Patent: Jun. 2, 2026

(54) DYNAMICALLY EVOLVING IMAGE BASED ON PURSUIT OF GOALS

(71) Applicant: The Toronto-Dominion Bank, Toronto (CA)

(72) Inventor: Jessica Mashkevich, Greenville, SC (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/472,091

(22) Filed: Sep. 21, 2023

(65) Prior Publication Data

US 2025/0104050 A1     Mar. 27, 2025

(51) Int. Cl.
     *G06Q 20/36*      (2012.01)
     *G06T 3/40*       (2024.01)
     *G06T 11/00*      (2026.01)

(52) U.S. Cl.
     CPC ........... *G06Q 20/3676* (2013.01); *G06T 3/40* (2013.01); *G06T 11/00* (2013.01); *G06T 2200/24* (2013.01)

(58) Field of Classification Search
     None
     See application file for complete search history.

(56) References Cited

U.S. PATENT DOCUMENTS

| 5,754,965 A | * | 5/1998 | Hagenbuch | ............ | G07C 5/008 |
| | | | | | 701/33.9 |
| 5,892,900 A | | 4/1999 | Ginter et al. | | |

| 5,910,987 A | | 6/1999 | Ginter et al. | | |
| 7,231,608 B1 | | 6/2007 | Fano et al. | | |
| 8,620,617 B2 | * | 12/2013 | Yuen | ....................... | G06F 11/00 |
| | | | | | 702/160 |
| 9,864,982 B2 | | 1/2018 | Bristow et al. | | |
| 9,922,356 B1 | * | 3/2018 | Garcia, III | ......... | G06Q 30/0609 |
| 9,978,027 B2 | * | 5/2018 | Gibby | .................... | G16H 40/67 |
| 10,147,062 B2 | | 12/2018 | Rainisto | | |

(Continued)

FOREIGN PATENT DOCUMENTS

| WO | | WO-03049065 A1 | * | 6/2003 | ............. | G06Q 30/02 |
| WO | | WO-2006116529 A2 | * | 11/2006 | ............. | G06Q 10/06 |

(Continued)

OTHER PUBLICATIONS

Slideegg Goal Tree PowerPoint Presentation Template and Google Slides. (Jan. 1, 2023). retrieved online Apr. 7, 2025. https://www.slideegg.com/goal-tree-template?srsltid=AfmBOoqPKPxzzCiHiAshyTWfpablv909iuPW-H8dvc5uvr99Lpe8cWo7 (Year: 2023).*

(Continued)

*Primary Examiner* — James A Reagan

(57) ABSTRACT

An example operation may include one or more of generating a unique image based on execution of an image generating model and displaying the unique image via a user interface of a software application, assigning a segment of the unique image to a goal at a first point in time based on user inputs via a user interface of the software application, monitoring account activity of a user within the software application, determining, at a second point in time, that the user is closer to the goal based on the monitored account activity of the user within the software application, and in response to the determination, increasing a size of the segment of the unique image assigned to the goal of the user.

20 Claims, 26 Drawing Sheets

(56) References Cited

U.S. PATENT DOCUMENTS

| | | |
|---|---|---|
| 10,163,085 B2 | 12/2018 | D'Agostino et al. |
| 10,178,246 B1 | 1/2019 | Horvath et al. |
| 10,181,114 B2 | 1/2019 | Tseretopoulos et al. |
| 10,275,807 B2 * | 4/2019 | Borchetta ............. H04L 67/306 |
| 10,339,931 B2 | 7/2019 | Tseretopoulos et al. |
| 10,346,824 B2 | 7/2019 | Chan et al. |
| 10,360,303 B2 | 7/2019 | Volkovs et al. |
| 10,405,146 B1 | 9/2019 | Kuruvilla et al. |
| 10,438,206 B2 | 10/2019 | Jivraj et al. |
| 10,440,196 B2 | 10/2019 | Horvath et al. |
| 10,440,197 B2 | 10/2019 | Horvath et al. |
| 10,460,748 B2 | 10/2019 | Tseretopoulos et al. |
| 10,482,675 B1 | 11/2019 | Sutter et al. |
| 10,659,400 B2 | 5/2020 | Moon et al. |
| 10,698,902 B2 | 6/2020 | Tseretopoulos et al. |
| 10,706,635 B2 | 7/2020 | Sutter et al. |
| 10,708,721 B2 | 7/2020 | Kuruvilla et al. |
| 10,728,259 B2 | 7/2020 | McCarter et al. |
| 10,776,619 B2 | 9/2020 | Collinson et al. |
| 10,824,941 B2 | 11/2020 | Volkovs et al. |
| 10,831,923 B2 | 11/2020 | Dunjic et al. |
| 10,832,047 B2 | 11/2020 | Moghtadai |
| 10,862,897 B2 | 12/2020 | D'Agostino et al. |
| 10,867,292 B2 | 12/2020 | Lin et al. |
| 10,867,293 B2 | 12/2020 | Bristow et al. |
| 10,878,816 B2 | 12/2020 | Tseretopoulos et al. |
| 10,896,391 B2 * | 1/2021 | Sherman ............ G06Q 30/0279 |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,977,617 B2 | 4/2021 | Tseretopoulos et al. |
| 10,984,178 B2 | 4/2021 | Schiffer et al. |
| 11,004,187 B2 | 5/2021 | Kuruvilla et al. |
| 11,017,028 B2 | 5/2021 | Dunjic et al. |
| 11,017,466 B1 | 5/2021 | Cunningham et al. |
| 11,030,415 B2 | 6/2021 | Volkovs et al. |
| 11,055,924 B2 | 7/2021 | Navarro et al. |
| 11,061,638 B2 | 7/2021 | Lam |
| 11,070,448 B2 | 7/2021 | Miller et al. |
| 11,087,314 B2 | 8/2021 | Gandhi et al. |
| 11,100,168 B2 | 8/2021 | Miller et al. |
| 11,107,569 B1 | 8/2021 | Devoto |
| 11,140,143 B2 | 10/2021 | Moon et al. |
| 11,144,921 B2 | 10/2021 | Dunjic et al. |
| 11,144,998 B2 | 10/2021 | Kuruvilla et al. |
| 11,145,169 B2 | 10/2021 | Pratten et al. |
| 11,182,860 B2 | 11/2021 | Kuruvilla et al. |
| 11,200,328 B2 | 12/2021 | Shpurov et al. |
| 11,200,411 B2 | 12/2021 | Rizvi et al. |
| 11,210,857 B2 | 12/2021 | Rizvi et al. |
| 11,222,286 B2 | 1/2022 | Choe et al. |
| 11,232,304 B2 | 1/2022 | Navarro et al. |
| 11,276,257 B2 | 3/2022 | Moghtadai et al. |
| 11,303,642 B2 | 4/2022 | Dunjic et al. |
| 11,334,574 B2 | 5/2022 | Caputo et al. |
| 11,341,313 B2 | 5/2022 | Lowery et al. |
| 11,347,744 B2 | 5/2022 | Tseretopoulos et al. |
| 11,348,099 B2 | 5/2022 | Vijayan |
| 11,349,871 B2 | 5/2022 | Moon et al. |
| 11,354,442 B2 | 6/2022 | Haldenby et al. |
| 11,361,566 B2 | 6/2022 | Collinson et al. |
| 11,373,229 B2 | 6/2022 | Tseretopoulos et al. |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,430,242 B2 | 8/2022 | Moghtadai |
| 11,436,809 B2 | 9/2022 | Rizvi et al. |
| 11,451,669 B1 | 9/2022 | Navarro et al. |
| 11,469,878 B2 | 10/2022 | Shpurov et al. |
| 11,470,091 B2 | 10/2022 | McCarter et al. |
| 11,470,143 B2 | 10/2022 | Joheb et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,507,622 B2 | 11/2022 | Grebenisan et al. |
| 11,507,868 B2 | 11/2022 | Kwong et al. |
| 11,521,151 B2 * | 12/2022 | de Oliveira ...... G06Q 10/06395 |
| 11,546,345 B2 | 1/2023 | D'Agostino et al. |
| 11,580,762 B2 | 2/2023 | Rizvi et al. |
| 11,587,306 B1 | 2/2023 | Jain et al. |
| 11,600,064 B2 | 3/2023 | Navarro et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,651,100 B2 | 5/2023 | Dunjic et al. |
| 11,663,488 B2 | 5/2023 | Volkovs et al. |
| 11,671,536 B2 | 6/2023 | Navarro et al. |
| 11,687,995 B2 | 6/2023 | Tseretopoulos et al. |
| 11,689,484 B2 | 6/2023 | Moon et al. |
| 11,699,287 B1 * | 7/2023 | Wang .................. G06Q 10/083 |
| 11,704,782 B2 | 7/2023 | Wakim et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,756,388 B2 | 9/2023 | Pratten et al. |
| 11,777,918 B2 | 10/2023 | Moon et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,797,962 B2 | 10/2023 | Jones et al. |
| 11,809,486 B2 | 11/2023 | Liu et al. |
| 11,809,577 B2 | 11/2023 | Begg et al. |
| 11,811,826 B2 | 11/2023 | Moon et al. |
| 11,842,252 B2 | 12/2023 | Kuang et al. |
| 11,875,398 B2 | 1/2024 | Pratten et al. |
| 11,880,811 B2 | 1/2024 | Pawelkiewicz et al. |
| 11,886,764 B2 | 1/2024 | Lam |
| 11,928,112 B2 | 3/2024 | Dunjic et al. |
| 11,941,525 B2 | 3/2024 | Morin et al. |
| 11,941,703 B2 | 3/2024 | Kuruvilla et al. |
| 11,955,117 B2 | 4/2024 | McDermid et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |
| 12,021,874 B2 | 6/2024 | Dunjic et al. |
| 12,039,535 B2 | 7/2024 | Dunjic et al. |
| 12,039,631 B2 * | 7/2024 | Hayasaka ............ H04N 23/631 |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,164,542 B1 | 12/2024 | Rahman et al. |
| 12,169,693 B2 | 12/2024 | Lu |
| 12,182,800 B2 | 12/2024 | Navarro et al. |
| 12,198,109 B2 | 1/2025 | Abbas |
| 12,198,510 B2 | 1/2025 | Pratten et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,549 B2 | 2/2025 | Bouëttéet al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |

(56) References Cited

U.S. PATENT DOCUMENTS

| | | | |
|---|---|---|---|
| 12,354,094 B2 | 7/2025 | Jones et al. | |
| 12,373,795 B2 | 7/2025 | Misler et al. | |
| 2006/0282302 A1* | 12/2006 | Hussain | G06Q 10/06 705/2 |
| 2008/0262882 A1* | 10/2008 | Farrell | G06Q 10/06398 705/7.41 |
| 2010/0088151 A1 | 4/2010 | Kim et al. | |
| 2013/0036193 A1* | 2/2013 | Padmanabhan | G06F 16/955 709/217 |
| 2013/0076788 A1 | 3/2013 | Zvi | |
| 2014/0272847 A1* | 9/2014 | Grimes | G09B 7/08 434/236 |
| 2015/0170303 A1* | 6/2015 | Geritz | G06Q 50/205 705/326 |
| 2016/0027196 A1 | 1/2016 | Schiffer et al. | |
| 2016/0232799 A1* | 8/2016 | Bartle | G09B 7/00 |
| 2017/0004719 A1* | 1/2017 | Laud | G09B 5/12 |
| 2017/0103432 A1* | 4/2017 | Borchetta | G06Q 30/0279 |
| 2017/0330119 A1* | 11/2017 | Sherman | G06Q 30/0239 |
| 2018/0204261 A1* | 7/2018 | Garcia, III | G06T 13/00 |
| 2018/0268818 A1 | 9/2018 | Schoenmackers et al. | |
| 2019/0172045 A1 | 6/2019 | Dunjic et al. | |
| 2019/0286950 A1 | 9/2019 | Kiapour et al. | |
| 2019/0354599 A1 | 11/2019 | Mital et al. | |
| 2020/0058068 A1 | 2/2020 | Gandhi et al. | |
| 2020/0394688 A1* | 12/2020 | Loflin | G06F 3/0483 |
| 2021/0027160 A1 | 1/2021 | Volkovs et al. | |
| 2021/0037040 A1 | 2/2021 | Aleks et al. | |
| 2021/0117893 A1 | 4/2021 | Sohum et al. | |
| 2021/0192412 A1* | 6/2021 | Krishnaswamy | G06Q 10/06375 |
| 2021/0232950 A1 | 7/2021 | Kono | |
| 2021/0264461 A1 | 8/2021 | Fam | |
| 2021/0407016 A1 | 12/2021 | Kuruvilla et al. | |
| 2022/0058489 A1 | 2/2022 | Volkovs et al. | |
| 2022/0108069 A1 | 4/2022 | Lee | |
| 2022/0157094 A1 | 5/2022 | Moghtadai et al. | |
| 2022/0172083 A1 | 6/2022 | Wu et al. | |
| 2022/0188705 A1 | 6/2022 | Davoodi et al. | |
| 2022/0198411 A1 | 6/2022 | Jones et al. | |
| 2022/0198432 A1 | 6/2022 | Jones et al. | |
| 2022/0198445 A1 | 6/2022 | Jones et al. | |
| 2022/0207295 A1 | 6/2022 | Stanevich et al. | |
| 2022/0207430 A1 | 6/2022 | Dickie et al. | |
| 2022/0207432 A1 | 6/2022 | Whelan et al. | |
| 2022/0207606 A1 | 6/2022 | Dickie et al. | |
| 2022/0222419 A1 | 7/2022 | Lowery et al. | |
| 2022/0245060 A1 | 8/2022 | Kathuria et al. | |
| 2022/0253834 A1 | 8/2022 | Vijayan | |
| 2022/0270155 A1 | 8/2022 | Volkovs et al. | |
| 2022/0277213 A1 | 9/2022 | Braviner et al. | |
| 2022/0277227 A1 | 9/2022 | Yu et al. | |
| 2022/0277323 A1 | 9/2022 | Whelan et al. | |
| 2022/0284450 A1 | 9/2022 | Asta et al. | |
| 2022/0300903 A1 | 9/2022 | Huang et al. | |
| 2022/0309573 A1 | 9/2022 | Mathew et al. | |
| 2022/0318573 A1 | 10/2022 | Smith et al. | |
| 2022/0318617 A1 | 10/2022 | Wong et al. | |
| 2022/0327397 A1 | 10/2022 | Braviner et al. | |
| 2022/0327430 A1 | 10/2022 | Zuberi et al. | |
| 2022/0327431 A1 | 10/2022 | Braviner et al. | |
| 2022/0327432 A1 | 10/2022 | Gutierrez Bugarin et al. | |
| 2022/0327625 A1 | 10/2022 | Leung et al. | |
| 2022/0335718 A1 | 10/2022 | Ma et al. | |
| 2022/0343422 A1 | 10/2022 | Zuberi et al. | |
| 2022/0351186 A1 | 11/2022 | Quigley et al. | |
| 2022/0351194 A1 | 11/2022 | Quigley et al. | |
| 2022/0366064 A1 | 11/2022 | Nikoghossian et al. | |
| 2022/0383301 A1 | 12/2022 | Jones et al. | |
| 2022/0383313 A1 | 12/2022 | Jones et al. | |
| 2022/0383314 A1 | 12/2022 | Jones et al. | |
| 2022/0391898 A1 | 12/2022 | Castinado et al. | |
| 2022/0405299 A1 | 12/2022 | Leung et al. | |
| 2022/0414495 A1 | 12/2022 | Stanevich et al. | |
| 2022/0414649 A1 | 12/2022 | Shannon, III et al. | |
| 2023/0000448 A1* | 1/2023 | McClure | A61B 5/7465 |
| 2023/0006809 A1 | 1/2023 | Shpurov et al. | |
| 2023/0007075 A1 | 1/2023 | Mcphee et al. | |
| 2023/0011451 A1 | 1/2023 | Lu | |
| 2023/0048437 A1 | 2/2023 | Karbasi et al. | |
| 2023/0070586 A1 | 3/2023 | Kapur et al. | |
| 2023/0083899 A1 | 3/2023 | Gandouet et al. | |
| 2023/0086191 A1 | 3/2023 | Jakobsson | |
| 2023/0086653 A1 | 3/2023 | Zykh et al. | |
| 2023/0107703 A1 | 4/2023 | Zhang et al. | |
| 2023/0108610 A1 | 4/2023 | Tang et al. | |
| 2023/0113752 A1 | 4/2023 | Jorlett et al. | |
| 2023/0115639 A1 | 4/2023 | Noskin et al. | |
| 2023/0119108 A1 | 4/2023 | Volkovs et al. | |
| 2023/0131935 A1 | 4/2023 | Volkovs et al. | |
| 2023/0153461 A1 | 5/2023 | Kalra et al. | |
| 2023/0176557 A1* | 6/2023 | Cella | G06Q 50/04 700/117 |
| 2023/0186291 A1 | 6/2023 | Haddad et al. | |
| 2023/0188349 A1 | 6/2023 | Moy et al. | |
| 2023/0195734 A1 | 6/2023 | Cashion et al. | |
| 2023/0196406 A1 | 6/2023 | Gandouet et al. | |
| 2023/0206216 A1 | 6/2023 | Lehmann et al. | |
| 2023/0222187 A1 | 7/2023 | Goldston et al. | |
| 2023/0222493 A1 | 7/2023 | Jain et al. | |
| 2023/0237471 A1 | 7/2023 | Siedleczka et al. | |
| 2023/0244917 A1 | 8/2023 | Loaiza Ganem et al. | |
| 2023/0244962 A1 | 8/2023 | Volkovs et al. | |
| 2023/0245285 A1* | 8/2023 | Dinh | G06V 10/60 382/274 |
| 2023/0252301 A1 | 8/2023 | Volkovs et al. | |
| 2023/0252591 A1 | 8/2023 | Brown | |
| 2023/0259883 A1 | 8/2023 | Misler et al. | |
| 2023/0267367 A1 | 8/2023 | Volkovs et al. | |
| 2023/0267475 A1 | 8/2023 | Navarro et al. | |
| 2023/0281604 A1* | 9/2023 | Robell | G06Q 30/018 |
| 2023/0306434 A1 | 9/2023 | Dunjic et al. | |
| 2023/0316485 A1 | 10/2023 | Wakim et al. | |
| 2023/0318994 A1 | 10/2023 | Moon et al. | |
| 2023/0336615 A1 | 10/2023 | Joheb et al. | |
| 2023/0342481 A1 | 10/2023 | Nikoghossian et al. | |
| 2023/0344814 A1 | 10/2023 | Moon et al. | |
| 2023/0351116 A1 | 11/2023 | Skaljin et al. | |
| 2023/0368048 A1 | 11/2023 | Yang et al. | |
| 2023/0377047 A1 | 11/2023 | Bouëttéet al. | |
| 2023/0385693 A1 | 11/2023 | Cresswell et al. | |
| 2023/0385694 A1 | 11/2023 | Cresswell et al. | |
| 2023/0386190 A1 | 11/2023 | Cresswell et al. | |
| 2023/0394452 A1 | 12/2023 | Jones et al. | |
| 2023/0401192 A1 | 12/2023 | Yang et al. | |
| 2023/0401553 A1 | 12/2023 | Navarro et al. | |
| 2023/0401572 A1 | 12/2023 | Navarro et al. | |
| 2023/0419302 A1 | 12/2023 | Navarro et al. | |
| 2023/0419402 A1 | 12/2023 | Ghelichi et al. | |
| 2024/0020534 A1 | 1/2024 | Perez Vallejo et al. | |
| 2024/0062117 A1 | 2/2024 | Kuang et al. | |
| 2024/0070470 A1* | 2/2024 | Smith, Jr. | G06Q 30/0631 |
| 2024/0106851 A1 | 3/2024 | Kennedy et al. | |
| 2024/0119346 A1 | 4/2024 | Chang et al. | |
| 2024/0126575 A1 | 4/2024 | Kiriakou et al. | |
| 2024/0127036 A1 | 4/2024 | Zuberi et al. | |
| 2024/0127214 A1 | 4/2024 | Wander et al. | |
| 2024/0135510 A1* | 4/2024 | Liu | G06V 10/945 |
| 2024/0193562 A1 | 6/2024 | Pratten et al. | |
| 2024/0202756 A1 | 6/2024 | Karl et al. | |
| 2024/0203405 A1 | 6/2024 | McDermid et al. | |
| 2024/0211732 A1 | 6/2024 | Wander et al. | |
| 2024/0212049 A1 | 6/2024 | Ghelichi et al. | |
| 2024/0220653 A1 | 7/2024 | D'Agostino | |
| 2024/0232614 A1 | 7/2024 | Esmaeili et al. | |
| 2024/0232950 A1 | 7/2024 | Navarro et al. | |
| 2024/0249310 A1 | 7/2024 | Rai et al. | |
| 2024/0256903 A1 | 8/2024 | Ens et al. | |
| 2024/0256904 A1 | 8/2024 | Leung et al. | |
| 2024/0256968 A1 | 8/2024 | Hosseinzadeh et al. | |
| 2024/0265055 A1 | 8/2024 | Purkayastha | |
| 2024/0281467 A1 | 8/2024 | Volkovs et al. | |
| 2024/0281808 A1 | 8/2024 | Vouitsis et al. | |

(56) References Cited

U.S. PATENT DOCUMENTS

| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0296595 A1 | 9/2024 | Daha et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0378683 A1* | 11/2024 | Gorski .................. G06Q 20/36 |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045601 A1 | 2/2025 | Zuberi et al. |
| 2025/0053387 A1 | 2/2025 | Wang et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëttéet al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

FOREIGN PATENT DOCUMENTS

| WO | WO-2013155336 A1 * | 10/2013 | ............... G09B 7/00 |
| WO | 2023028462 A1 | 3/2023 | |
| WO | 2023097026 A2 | 6/2023 | |

OTHER PUBLICATIONS

VISME. "Goal Completion—Gauge Chart Template." (Feb. 2, 2021). Retrieved online Apr. 7, 2025. https://www.visme.co/templates/charts/goal-completion-gauge-chart-1425284141/ (Year: 2021).*

CauseVox. "Fundraising Thermometer Creator." (Aug. 3, 2021). Retrieved online Apr. 7, 2025. https://www.causevox.com/fundraising-thermometer/ (Year: 2021).*

Battah, Ammar, et al. "Blockchain and NFTs for trusted ownership, trading, and access of AI models." IEEE Access 10 (2022): 112230-112249. (Year: 2022).

(56)           References Cited

OTHER PUBLICATIONS

Heglin et al., "Auto-Adjudication Process Via Machine Learning,"
U.S. Appl. No. 19/053,942, filed Feb. 14, 2025.

* cited by examiner

Figure 1A:
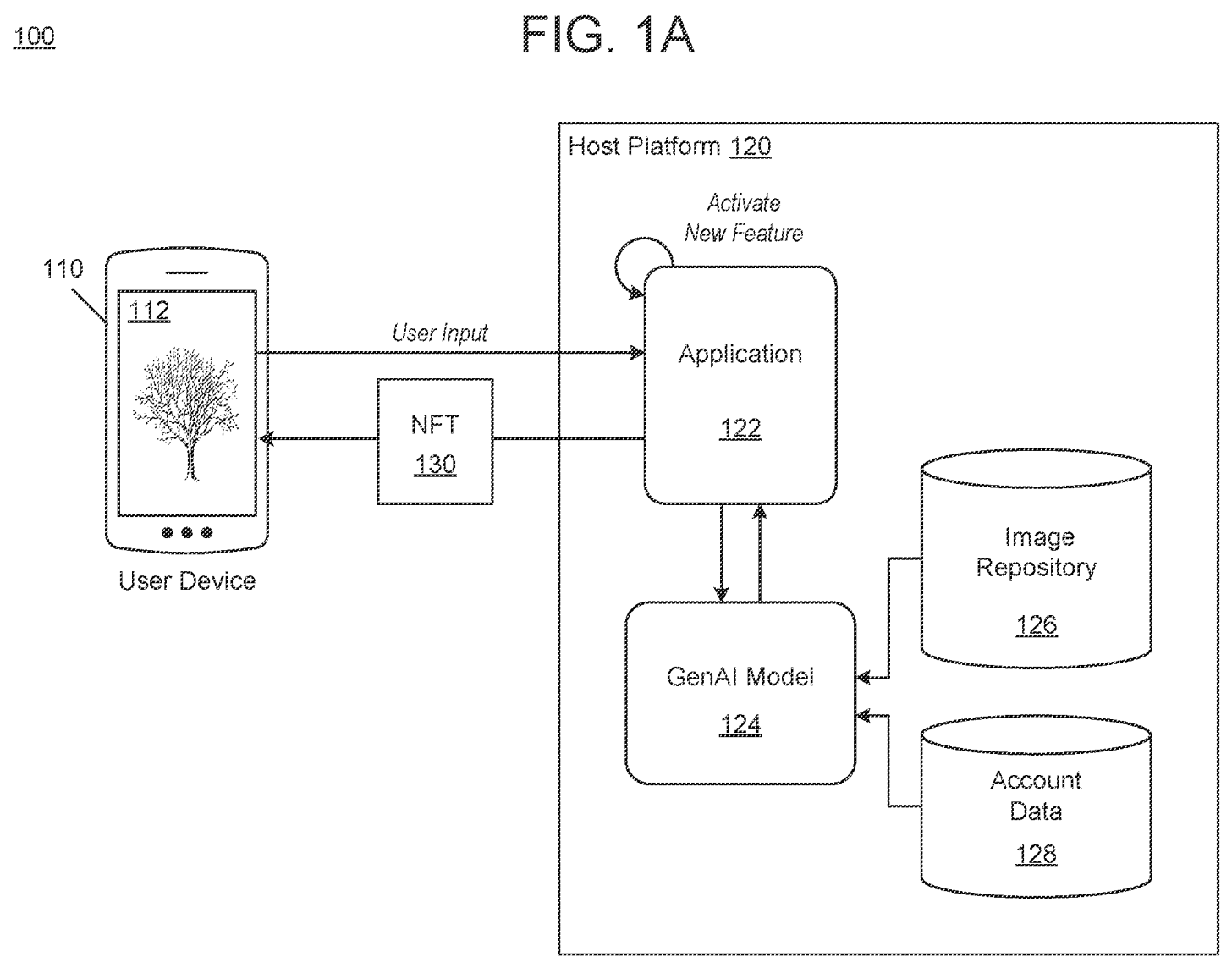

Host Platform 120

Activate
New Feature

Application
122

GenAI Model
124

Image
Repository
126

Account
Data
128

User Input

NFT
130

112

110

User Device

Figure 5A:
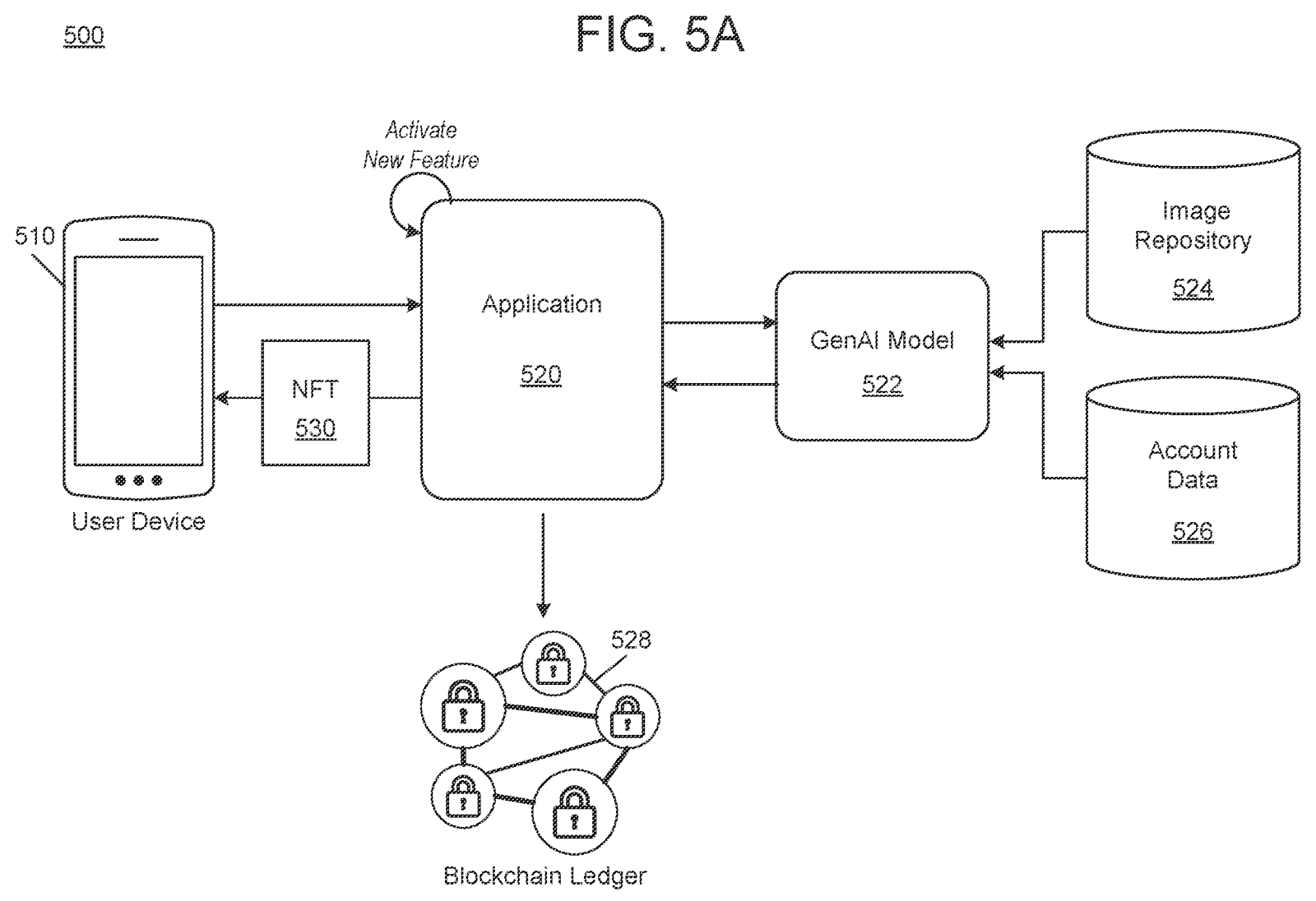

Activate New Feature

Application
520

GenAI Model
522

Image Repository
524

Account Data
526

NFT
530

User Device

528

Blockchain Ledger

User Interface 600

FIG. 6B

User Interface 600b

Figure 6C:
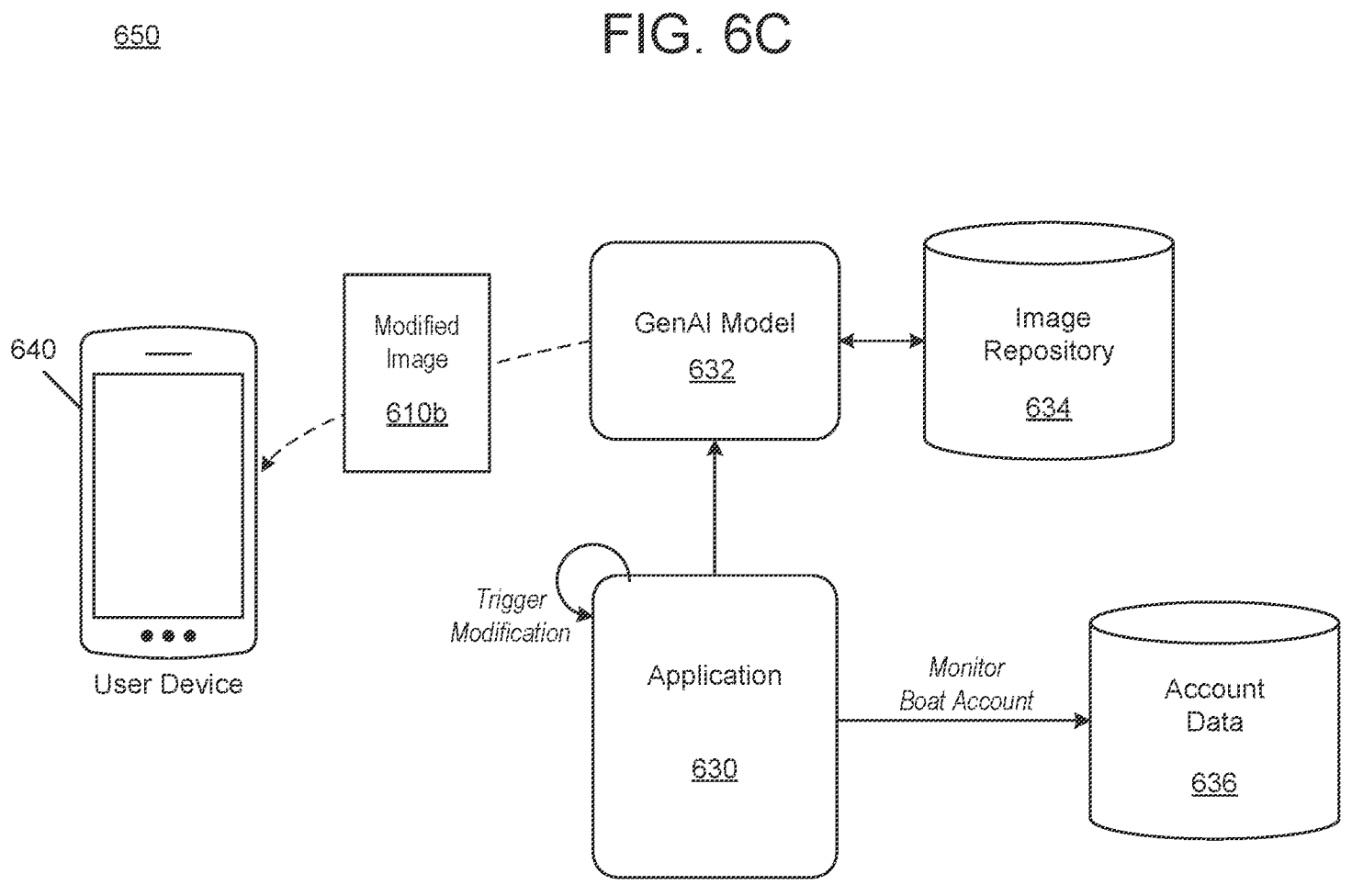

Image Repository
634

GenAI Model
632

Account Data
636

Monitor Boat Account

Application
630

Trigger Modification

Modified Image
610b

User Device

User Interface 600d

User interface 700

User Interface 700b

710

720

712

900                        FIG. 9A
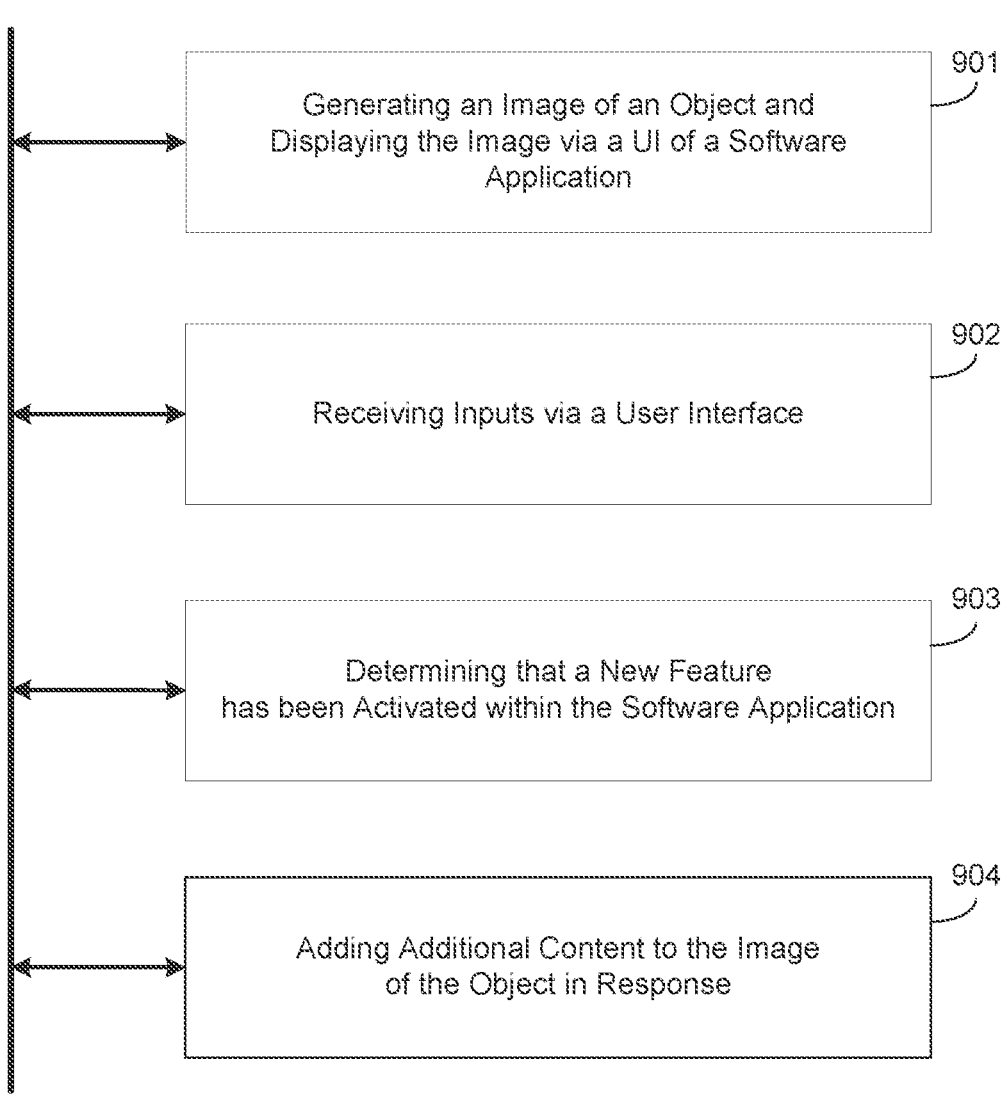
901
Generating an Image of an Object and
Displaying the Image via a UI of a Software
Application
902
Receiving Inputs via a User Interface
903
Determining that a New Feature
has been Activated within the Software Application
904
Adding Additional Content to the Image
of the Object in Response

910

Generating a Unique Image and Displaying it via a UI of a Software Application

911

Assigning a Segment of the Unique Image to a Goal of a User

912

Monitoring Account Activity of a User

913

Determining that the User is Closer to the Goal

914

Increasing a Size of the Image Segment within the Unique Image

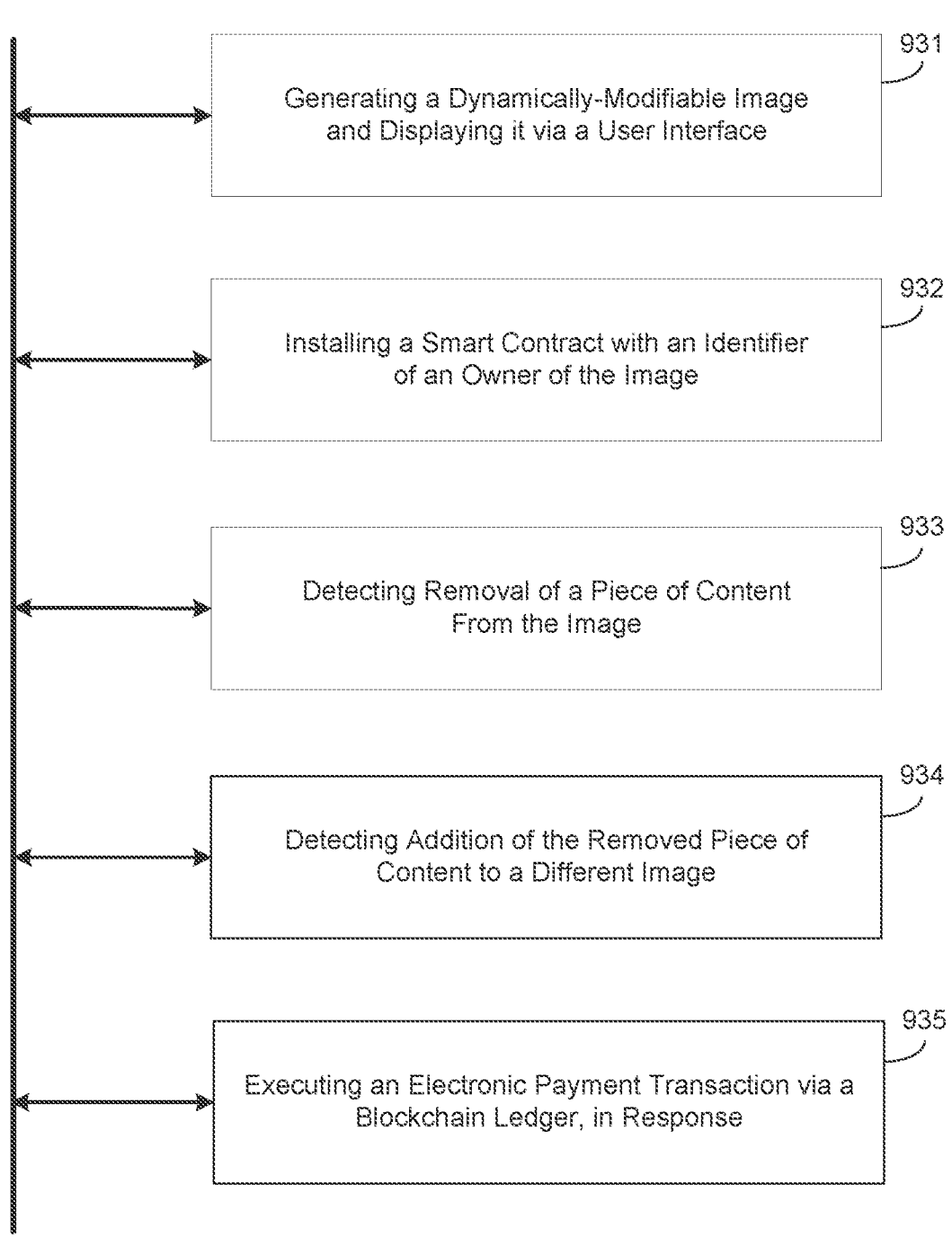

931 Generating a Dynamically-Modifiable Image
and Displaying it via a User Interface 932 Installing a Smart Contract with an Identifier
of an Owner of the Image 933 Detecting Removal of a Piece of Content
From the Image 934 Detecting Addition of the Removed Piece of
Content to a Different Image 935 Executing an Electronic Payment Transaction via a
Blockchain Ledger, in Response 1000    FIG. 10
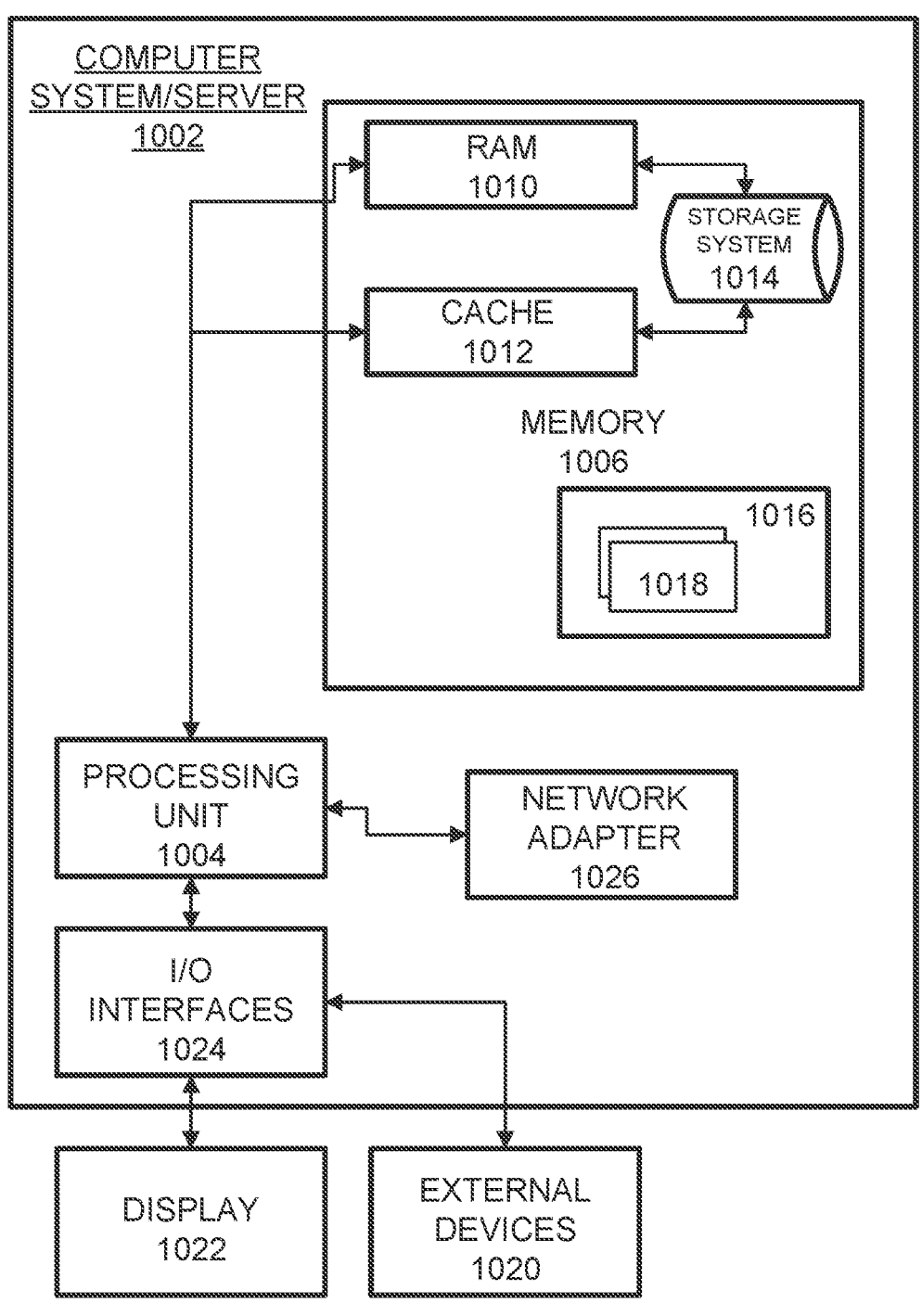

DYNAMICALLY EVOLVING IMAGE BASED ON PURSUIT OF GOALS

BACKGROUND

Studies have shown that a visual representation of a goal can help a user visualize and achieve that goal better than without such visual representation. Meanwhile, a non-fungible token (NFT) is a unique design, such as an image, a video, a hologram, a cartoon, text, etc., that is recorded on a blockchain ledger. The owner of the NFT may be recorded on a blockchain ledger thereby creating a unique/tangible design that includes proof of ownership.

SUMMARY

One example embodiment provides an apparatus that may include a memory, a display, and a processor coupled to the memory and the display, the processor configured to generate an image of an object based on execution of a generative artificial intelligence (GenAI) model and display the image via a user interface of a software application, receive inputs via the user interface, determine that a new feature of the software application has been activated by a user account of the software application based on the received inputs, and in response to the detected activation of the new feature, add additional content to the image of the object based on execution of the GenAI model on information associated with the new feature and refresh the display of the image of the object within the user interface of the software application.

Another example embodiment provides a method that includes one or more of generating an image of an object based on execution of a generative artificial intelligence (GenAI) model and displaying the image via a user interface of a software application, receiving inputs via the user interface, determining that a new feature of the software application has been activated by a user account of the software application based on the received inputs, and in response to the detected activation of the new feature, adding additional content to the image of the object based on execution of the GenAI model on information associated with the new feature and refreshing a display of the image of the object within the user interface of the software application.

A further example embodiment provides a computer-readable medium comprising instructions, that when read by a processor, cause the processor to perform one or more of generating an image of an object based on execution of a generative artificial intelligence (GenAI) model and displaying the image via a user interface of a software application, receiving inputs via the user interface, determining that a new feature of the software application has been activated by a user account of the software application based on the received inputs, and in response to the detected activation of the new feature, adding additional content to the image of the object based on execution of the GenAI model on information associated with the new feature and refreshing a display of the image of the object within the user interface of the software application.

A further example embodiment provides an apparatus that may include a memory, a display, and a processor coupled to the memory and the display, the processor configured to: generate a unique image based on execution of an image generating model and displaying the unique image via a user interface of a software application, assign a segment of the unique image to a goal at a first point in time based on user inputs via a user interface of the software application, monitor account activity of a user within the software application, determine, at a second point in time, that the user is closer to the goal based on the monitored account activity of the user within the software application, and in response to the determination, increasing a size of the segment of the unique image assigned to the goal of the user.

A further example embodiment provides a method that includes one or more of generating a unique image based on execution of an image generating model and displaying the unique image via a user interface of a software application, assigning a segment of the unique image to a goal at a first point in time based on user inputs via a user interface of the software application, monitoring account activity of a user within the software application, determining, at a second point in time, that the user is closer to the goal based on the monitored account activity of the user within the software application, and in response to the determination, increasing a size of the segment of the unique image assigned to the goal of the user.

A further example embodiment provides a computer-readable medium comprising instructions, that when read by a processor, cause the processor to perform one or more of generating a unique image based on execution of an image generating model and displaying the unique image via a user interface of a software application, assigning a segment of the unique image to a goal at a first point in time based on user inputs via a user interface of the software application, monitoring account activity of a user within the software application, determining, at a second point in time, that the user is closer to the goal based on the monitored account activity of the user within the software application, and in response to the determination, increasing a size of the segment of the unique image assigned to the goal of the user.

A further example embodiment provides an apparatus that may include a memory, a display, and a processor coupled to the memory and the display, the processor configured to generate a unique image comprising a plurality of image segments via an image generating model and displaying the unique image via a user interface of a software application, install a smart contract associated with the unique image on a blockchain ledger, detect a command to move an image segment from among the plurality of image segments based on user inputs via the user interface of the software application, and remove the image segment from the unique image and adding the image segment to a different image based on the detected command, and transmit the different image to a user account of the software application.

A further example embodiment provides a method that includes one or more of generating a unique image comprising a plurality of image segments via an image generating model and displaying the unique image via a user interface of a software application, installing a smart contract associated with the unique image on a blockchain ledger, detecting a command to move an image segment from among the plurality of image segments based on user inputs via the user interface of the software application, and removing the image segment from the unique image and adding the image segment to a different image based on the detected command, and transmitting the different image to a user account of the software application.

A further example embodiment provides a computer-readable medium comprising instructions, that when read by a processor, cause the processor to perform one or more of generating a unique image comprising a plurality of image segments via an image generating model and displaying the unique image via a user interface of a software application, installing a smart contract associated with the unique image on a blockchain ledger, detecting a command to move an image segment from among the plurality of image segments based on user inputs via the user interface of the software application, and removing the image segment from the unique image and adding the image segment to a different image based on the detected command, and transmitting the different image to a user account of the software application.

A further example embodiment provides an apparatus that may include a memory, a display, and a processor coupled to the memory and the display, the processor configured to generate a dynamically-modifiable image comprising a plurality of pieces of interconnected content via an image generating model and display the dynamically-modifiable image via a user interface of a software application, install a smart contract that includes an identifier of an owner of the dynamically-modifiable image on a blockchain ledger, detect removal of a piece of content from among the plurality of pieces of interconnected content based on user inputs via the user interface, detect addition of the removed piece of content to a different dynamically-modifiable image of a different user, and in response to the detected addition, execute an electronic payment transaction to transfer value from the owner of the dynamically-modifiable image to the different user based on the smart contract installed on the blockchain ledger.

A further example embodiment provides a method that includes one or more of generating a dynamically-modifiable image comprising a plurality of pieces of interconnected content via an image generating model and displaying the dynamically-modifiable image via a user interface of a software application, installing a smart contract that includes an identifier of an owner of the dynamically-modifiable image on a blockchain ledger, detecting removal of a piece of content from among the plurality of pieces of interconnected content based on user inputs via the user interface, detecting addition of the removed piece of content to a different dynamically-modifiable image of a different user, and in response to the detected addition, executing an electronic payment transaction to transfer value from the owner of the dynamically-modifiable image to the different user based on the smart contract installed on the blockchain ledger.

A further example embodiment provides a computer-readable medium comprising instructions, that when read by a processor, cause the processor to perform one or more of generating a dynamically-modifiable image comprising a plurality of pieces of interconnected content via an image generating model and displaying the dynamically-modifiable image via a user interface of a software application, installing a smart contract that includes an identifier of an owner of the dynamically-modifiable image on a blockchain ledger, detecting removal of a piece of content from among the plurality of pieces of interconnected content based on user inputs via the user interface, detecting addition of the removed piece of content to a different dynamically-modifiable image of a different user, and in response to the detected addition, executing an electronic payment transaction to transfer value from the owner of the dynamically-modifiable image to the different user based on the smart contract installed on the blockchain ledger.

BRIEF DESCRIPTION OF THE DRAWINGS

FIG. 1A is a diagram illustrating a generative artificial intelligence (GenAI) computing environment for generating images according to example embodiments.

FIGS. 3A-3C are diagrams illustrating processes for training an artificial intelligence (AI) model according to example embodiments.

FIG. 4 is a diagram illustrating a process of prompting a GenAI model to generate an architecture diagram according to example embodiments.

FIGS. 5A-5D are diagrams illustrating a process of dynamically evolving an image based on feature activation according to example embodiments.

FIGS. 6A-6D are diagrams illustrating a process of dynamically evolving an image based on progress towards a goal according to example embodiments.

FIGS. 7A-7D are diagrams illustrating a process of transferring a portion of an image to another user account according to example embodiments.

FIG. 9A is a diagram illustrating a method of generating a software test case using GenAI according to example embodiments.

FIG. 9D is a diagram illustrating a method of identifying a vulnerability in a software program and generating a fix for the vulnerability according to example embodiments.

FIG. 10 is a diagram illustrating a computing system that may be used in any of the example embodiments described herein.

DETAILED DESCRIPTION

Figure 1B:
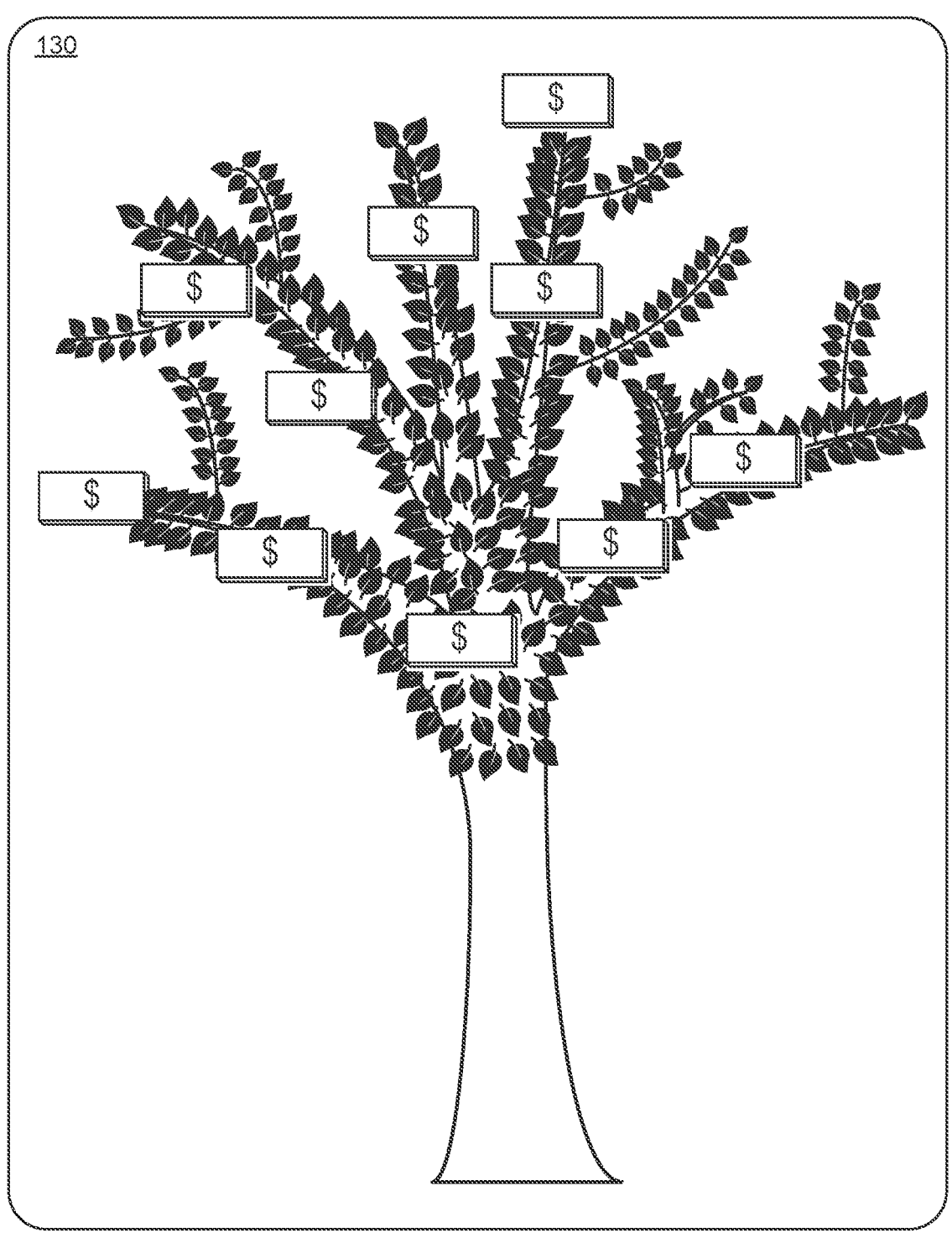
FIG. 1B is a diagram illustrating an example of a unique image generated by GenAI according to example embodiments.

It is to be understood that although this disclosure includes a detailed description of cloud computing, implementation of the teachings recited herein is not limited to a cloud computing environment. Instead, embodiments of the instant solution are capable of being implemented in conjunction with any other type of computing environment now known or later developed.

The example embodiments are directed to generating a design, such as a non-fungible token (NFT) that helps a user visualize and understand their goals. The design may be generated by a generative artificial intelligence (GenAI) model, which may also be updated, modified, etc., by the GenAI model.

For example, the image can evolve as the user becomes more involved with their goal. Furthermore, the image can be modified by the user and transferred/sold to other users. Conditions managing the exchange of the NFT or the portion of the NFT can be stored within a blockchain smart contract installed on the blockchain ledger where the NFT is stored.

According to various embodiments, the GenAI model may be a large language model (LLM), such as a multimodal large language model. As another example, the GenAI model may be a transformer neural network ("transformer")

or the like. The GenAI model can understand images about an object or multiple types of objects.

For example, the GenAI model may be trained on a large corpus of images associated with trees. Here, the GenAI model may be able to generate a new digital tree based on the training. For example, the GenAI model may include libraries and deep learning frameworks that enable the GenAI model to create images, animations, text, and the like, which are then embedded into an NFT.

Furthermore, the GenAI model described herein can be integrated within a more extensive artificial intelligence system that includes machine learning and artificial intelligence models, other GenAI models, and the like.

This system can perform additional functionality through the environment where the NFT is stored and managed. For example, a user may have an image dedicated to using a software application. The image may grow when a new product feature within the software application is activated. That is, the software application can identify the activation of the feature and evolve/grow the image in response to help the user visualize the additional activity to their account.

FIG. 1A illustrates a GenAI computing environment 100 that includes a host platform 120 that hosts a software application 122 such as a mobile application, progressive web application (PWA), on-premises application, etc. In addition, the host platform 120 also hosts a GenAI model 124 capable of generating images and NFTs according to example embodiments. Here, the GenAI model 124 may generate images based on a corpus of images stored within an image repository 126. As another example, the GenAI model 124 may receive account data such as monitored account activity from a database 128. The GenAI model 124 may generate unique images based on the images within the image repository 126 and the account data within the database 128.

In the example of FIG. 1A, a user may submit a request for a new image to be generated to the software application 122 via a user device 110. In this example, the host platform 120 may be a could platform, a web server, an on-premises server, or the like, and the user device 110 may be a network-connected device such as a mobile device, a laptop, a tablet, a desktop computer, or the like. In response to receiving the request, the software application 122 may send an API call or the like to the GenAI model 124 with information about the user such as an object type to be created, a current account balance, information about a goal, etc.

Based on the information provided, the GenAI model 124 may generate a unique image, such as an image of an object that can move, sway, shake, bend, fold, etc., through user interaction. The unique image may be sent to the software application 122, which converts it into an NFT 130. The NFT 130 is then delivered to the user device 110. For example, the NFT 130 may be displayed on a user interface 112 of the user device 110. Here, the user may enter commands on the user interface 112 to alter the NFT 130, to sell the NFT 130 or a portion of the NFT 130, and the like.

FIG. 1B illustrates an example of an NFT 130 generated by the GenAI model 124 in FIG. 1A, according to example embodiments. Referring to FIG. 1B, the GenAI model 124 may generate a diagram of objects such as a tree, a boat, a house, a car, etc. In this example, the GenAI model 124 has generated an image of a digital tree/money tree. The tree may be used to visually represent the pursuit of goals such as saving for a future purchase, or the like. Over time, the NFT 130 can be modified. For example, branches, leaves, twigs, bark, and other content may be added to or removed from the tree. For example, a blockchain may transfer portions of the NFT 130 to another user.

In this example, the NFT 130 may be a static image, a continuously moving image, an animation, a video, a combination of images and text, or the like. The design may be interactive in that the user can select pieces of content from the NFT 130, pull pieces of content (e.g., branches, leaves, etc.) out of the NFT 130, and send them to other users.

Figure 2:
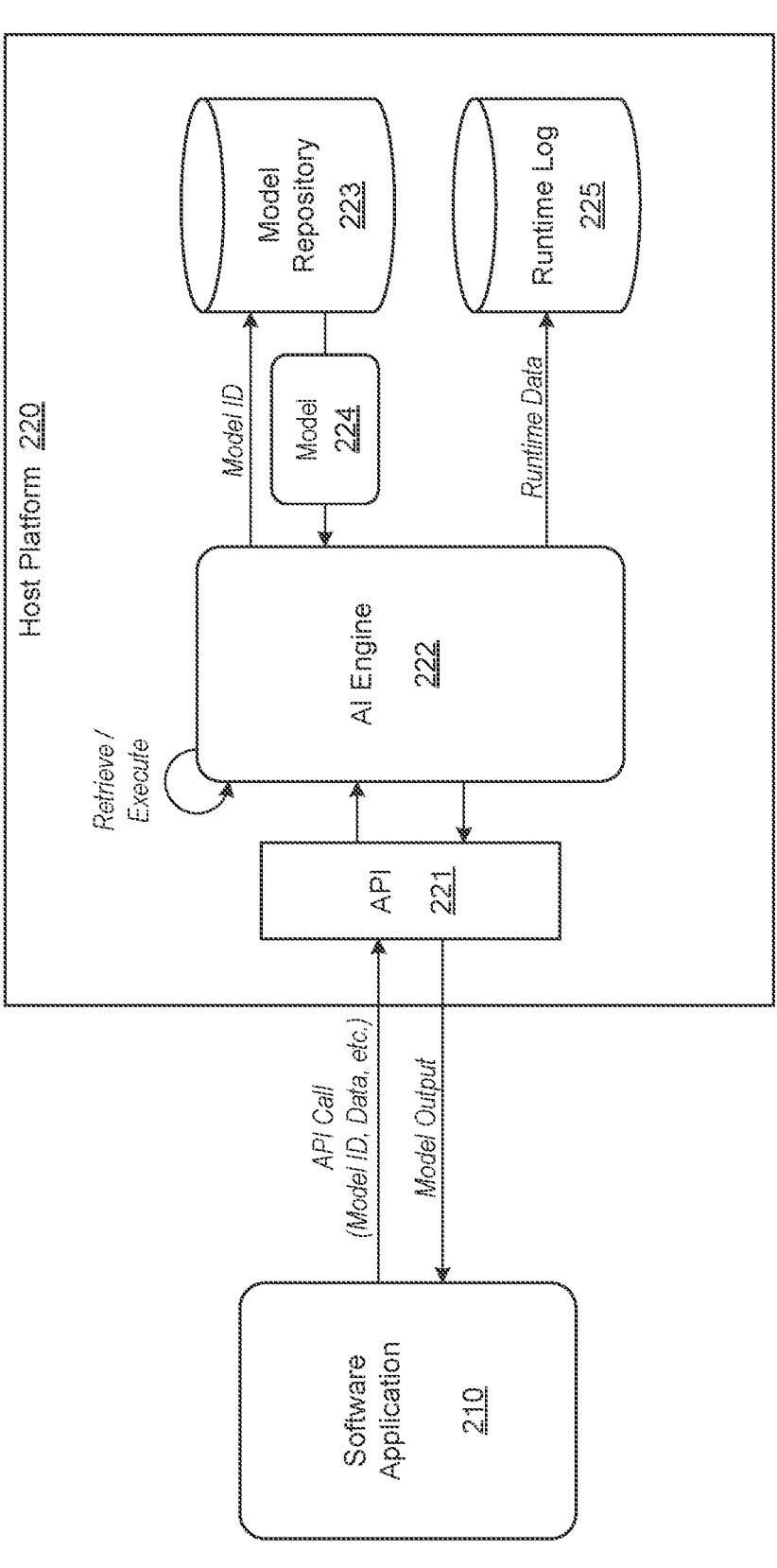
FIG. 2 is a diagram illustrating a process of executing a predictive model on input content according to example embodiments.

FIG. 2 illustrates process 200 of executing model 224 on input content according to example embodiments. For example, model 224 may be the GenAI model. However, embodiments are not limited thereto. Referring to FIG. 2, a software application 210 may request execution of the model 224 by submitting a request to the host platform 220. In response, an AI engine 222 may receive the request and trigger model 224 to execute within a runtime environment of the host platform 220.

In FIG. 2, the AI engine 222 may control access to models stored within the model repository 223. For example, the models may include GenAI models, AI models, machine learning models, neural networks, and/or the like. The software application 210 may trigger execution of the model 224 from the model repository 223 via submission of a call to an API 221 (application programming interface) of the AI engine 222. The request may include an identifier of model 224, such as a unique ID assigned by the host platform 220, a payload of data (e.g., to be input to the model during execution), and the like. The AI engine 222 may retrieve model 224 from model repository 223 in response and deploy model 224 within a live runtime environment. After the model is deployed, the AI engine 222 may execute the running instance of model 224 on the payload of data and return a result of the execution to the software application 210.

In some embodiments, the data payload may be a format that cannot be input to model 224 nor read by a computer processor. For example, the data payload may be in text, image, audio, etc. In response, the AI engine 222 may convert the data payload into a format readable by model 224, such as a vector or other encoding.

The vector may then be input to the model 224.

In some embodiments, the software application 210 may display a user interface enabling a user to provide feedback from the output provided by model 224. For example, a user may input a confirmation about an image/NFT generated by a GenAI model.

This information may be added to the results of execution and stored within a log 225. Log 225 may include an identifier of the input, an identifier of the output, an identifier of the model used, and feedback from the recipient. This information may be used to subsequently retrain the model.

Figure 3A:
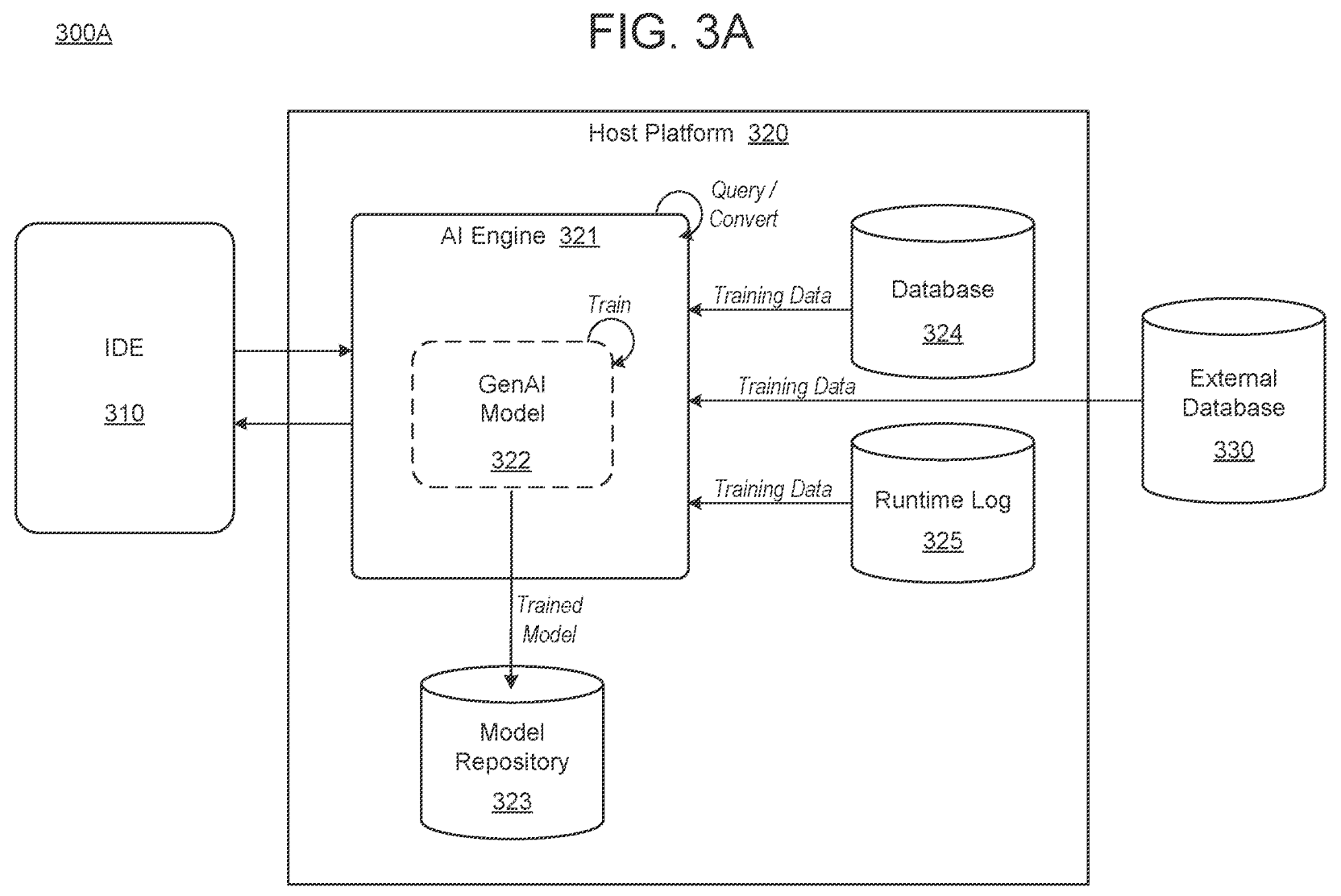

FIG. 3A illustrates a process 300A of training a GenAI model 322 according to example embodiments. However, it should be appreciated that the process 300A shown in FIG. 3A also applies to other models, such as machine learning models, AI models, and the like. Referring to FIG. 3A, a host platform 320, may host an IDE 310 (integrated development environment) where GenAI models, machine learning models, AI models, and the like may be developed, trained, retrained, and the like. In this example, the IDE 310 may include a software application with a user interface accessible by a user device over a network or through a local connection.

For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a generative artificial intelligence model that can receive text as input and generate custom imagery, etc. The model can then be executed/ trained based on the training data established via the user interface. For example, the user interface may be used to build a new model. The training data for training such a new model may be provided from a training data store such as database 324, which includes training samples from the web, customers, and the like. As another example, the training data may be pulled from one or more external data stores 330, such as publicly available sites.

The GenAI model 322 may be executed on training data via an AI engine 321 of the host platform 320 during training. The training data may include a large corpus of text from software tests, best practice documentation, compliance documentation, etc. In the example embodiments, the training data may include a large corpus of images. In some cases, the images may be dedicated to a particular topic (e.g., trees, etc.). The GenAI model 322 may learn mappings/ connections between requirements associated with drawings and goals created by a user. When the model is fully trained, it may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/images custom generated by the GenAI model 322 and the user feedback of the images may be used to retrain the model to enhance the images generated for all users. This data may be captured and stored within a runtime log 325 or other data store within the live environment and can be subsequently used to retrain the GenAI model 322.

Figure 3B:
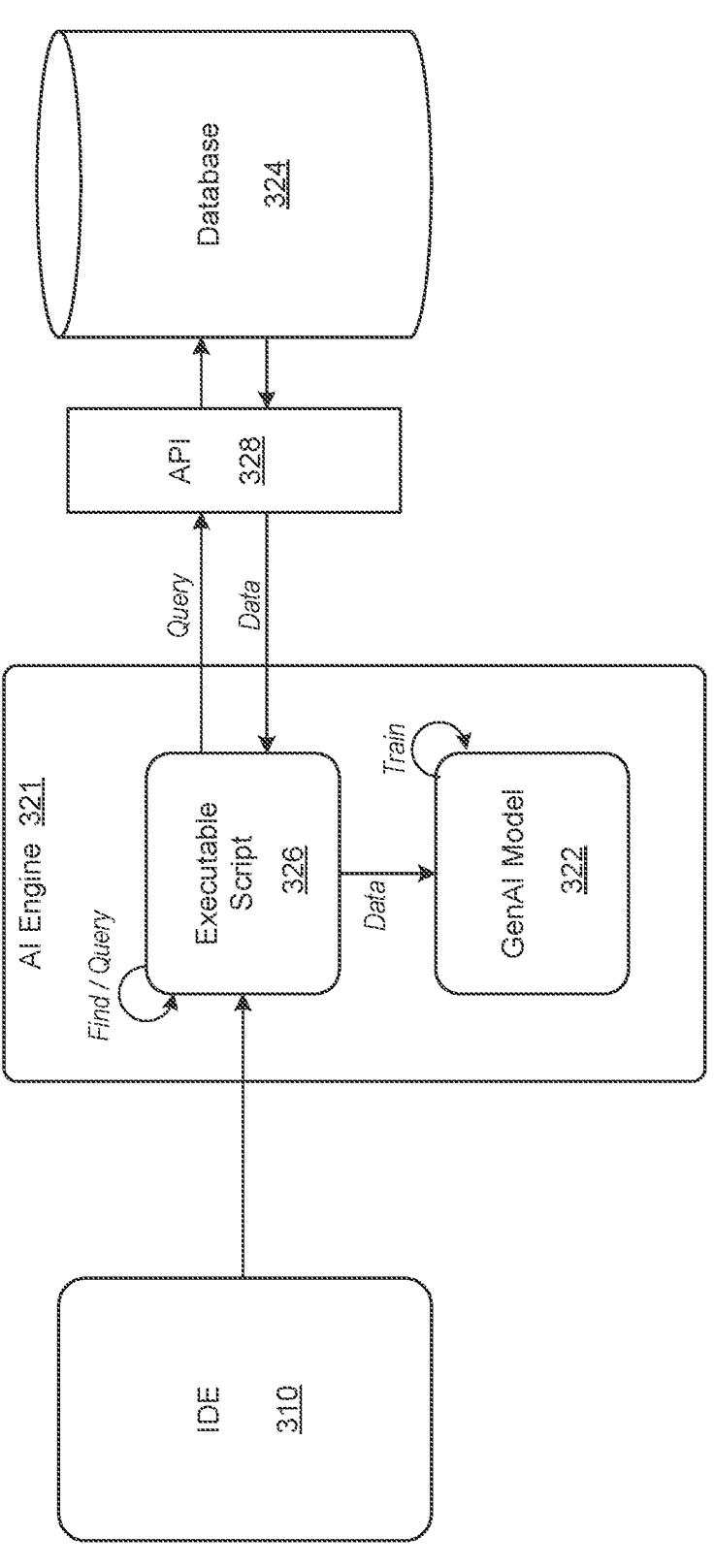

FIG. 3B illustrates process 300B of executing a training process for training/retraining the GenAI model 322 via an AI engine 321. In this example, a script 326 (executable) is developed and configured to read data from a database 324 and input the data to the GenAI model 322 while the GenAI model is running/executing via the AI engine 321.

For example, script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, which is input to the GenAI model 322. The process may be managed via a user interface of the IDE 310, which enables a human-in-the-loop during the training process (supervised learning). However, it should also be appreciated that the system is capable of unsupervised learning.

The script 326 may iteratively retrieve additional training data sets from the database 324 and iteratively input the additional training data sets into the GenAI model 322 during the execution of the model to continue to train the model. The script may continue until instructions within the script tell the script to terminate, which may be based on number of iterations (training loops), total time elapsed during the training process, etc.

Figure 3C:
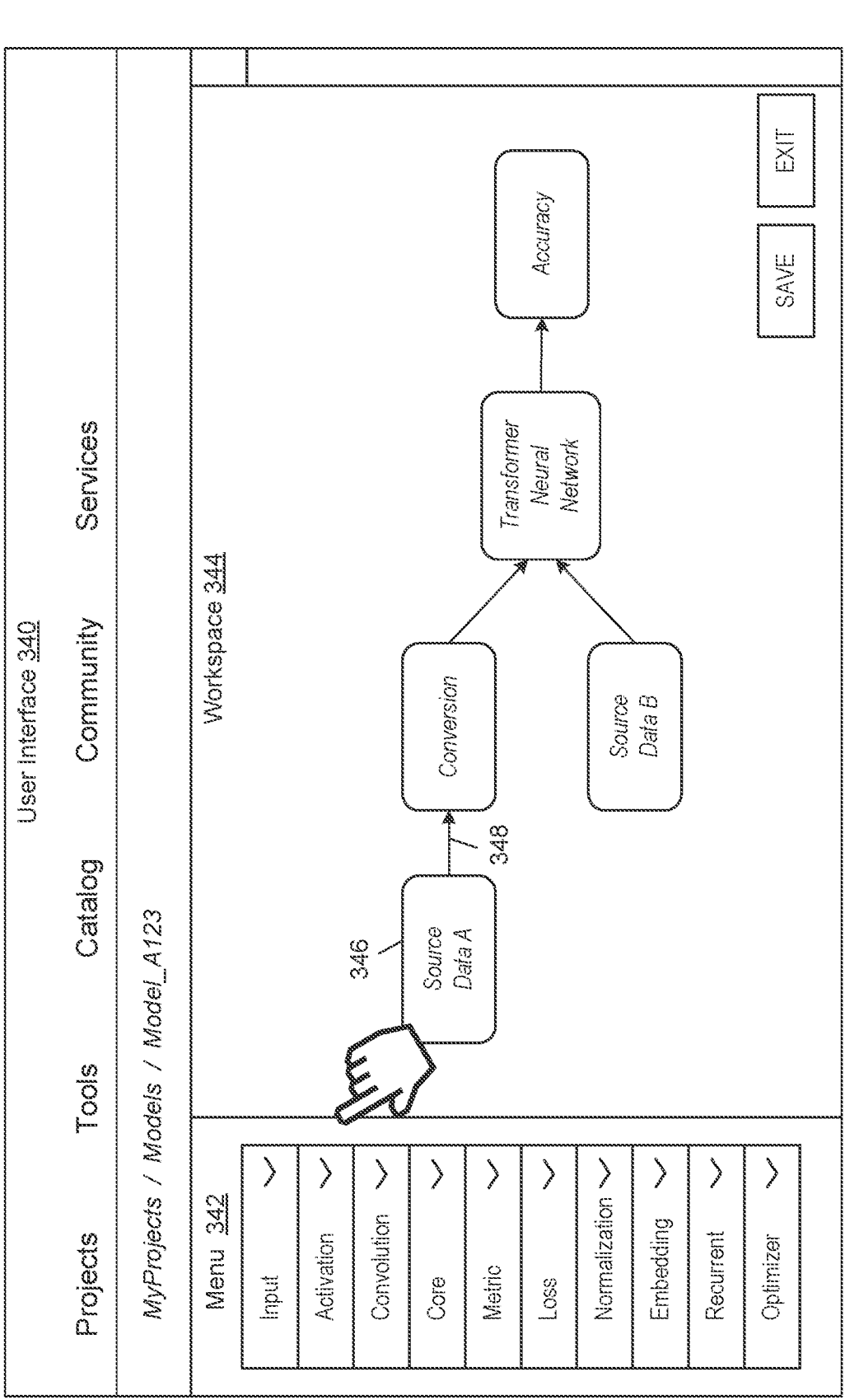

FIG. 3C illustrates a process 300C of designing a new AI model via a user interface 340 according to example embodiments. For example, the user interface 340 may be output as part of the software application that interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, menu 342 includes a plurality of graphical user interface (GUI) menu options, which can be selected to drill down into additional components that can be added into the model design shown in workspace 344.

Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a new model diagram within the workspace 344. For example, the user may connect node 346 to another node in the diagram via edge 348, creating a dependency within the diagram. When the user is done, the user can save the model for subsequent training/testing.

According to various embodiments, the GenAI model described herein may be trained based on custom-defined prompts designed to draw out specific attributes associated with a unique/custom image to be generated for a user. These same prompts may be output during live execution of the GenAI model. For example, a user may input a goal description, such as a financial amount that needs to be saved and an item identifier. The GenAI model can then use the requirements to generate an image/NFT that represents the item. The prompts may be generated via prompt engineering that can be performed through the model training process, such as the model training process described above in the examples of FIGS. 3A-3C.

Prompt engineering is structuring sentences (prompts) so the GenAI model understands them. A prompt may ask for and receive a description of a testing feature to be included in a software test. The text may be input to the GenAI model and used to create a new, unique image. Part of the prompting process may include delays/waiting times that are intentionally included within the script such that the model has time to think/understand the input data.

Figure 4:
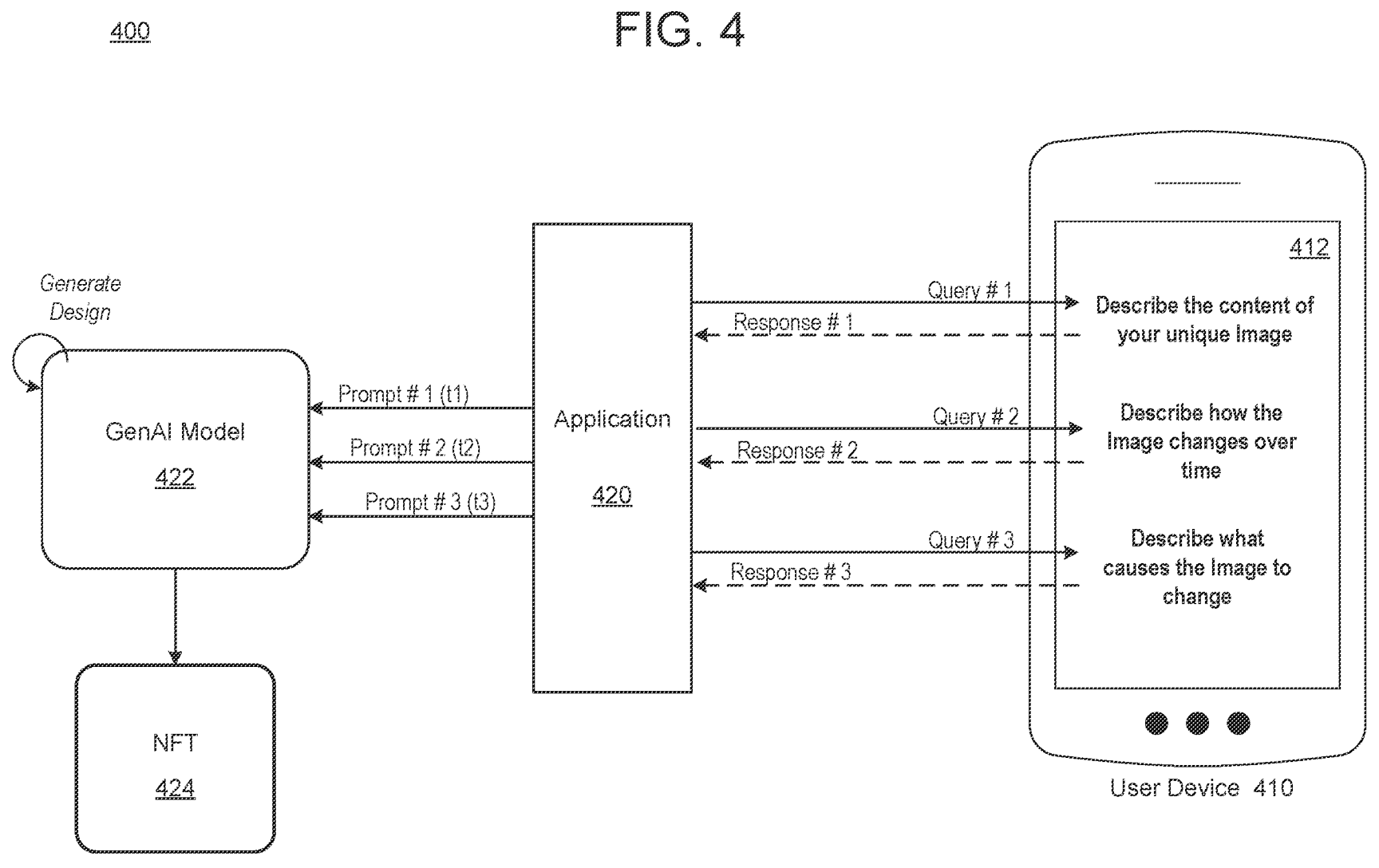

FIG. 4 illustrates process 400 of a GenAI model 422 generating an NFT 424 based on prompts and responses to the prompts according to example embodiments. Referring to FIG. 4, the GenAI model 422 may be hosted by a host platform and may be part of a software application 420 that is also hosted on the host platform.

Here, the software application 420 may establish a connection with a user device 410, such as a secure network connection. The secure connection may include a PIN, biometric scan, password, username, TTL handshake, etc.

In the example of FIG. 4, the software application 420 may control the interaction of the GenAI model 422 on the host platform and the user device 410. In this example, the software application 420 may output queries on a user interface 412 of the user device 410 with user information requests. The user may enter values into the fields on the user interface corresponding to the queries and submit/ transfer the data to the software application 420, for example, by pressing a submit button, etc. In this example, the application may combine the query with the response from the user interface and generate a prompt submitted to the GenAI model 422. For example, each prompt may include a combination of a query on the UI plus the response from the user. For example, if the query is "Describe the content to be included in your image" and the response is "The image should include a money tree that evolves based on my savings goal," then the text from both the prompt and the response to the prompt may be submitted to the GenAI model 422.

In some embodiments, the software application 420 may deliberately add waiting times between submitting prompts to the GenAI model 422 to ensure the model has enough time to "think" about the answer. The waiting times may be integrated into the code of the software application 420, or they may be modified/configured via a user interface. Furthermore, the ordering of the prompts and the follow-up questions may differ depending on the answers given during the previous prompt or prompts. The content within the prompts and the ordering of the prompts can cause the GenAI model 422 to generate software tests, automation scripts, source code, or the like.

FIGS. 5A-5D illustrates a process of dynamically evolving an image based on feature activation according to example embodiments.

For example, FIG. 5A illustrates a process 500 of dynamically modifying a unique image based on activating a new feature within a software application. Referring to FIG. 5A, a user may use a user device 510 to send a request for a unique image to a software application, 520, which may be hosted by a host platform (not shown). The software application 520 may forward the request to a GenAI model 522, which generates an image and returns it to the software application 520. For example, the GenAI model 522 may ingest images from an image repository 524 and account data from an account data database 526 and generate a unique image.

For example, the request from the user may include an identifier of a type of image, type of object to be included in the image, and the like. The GenAI model 522 may use this information to build a custom image for the user. The custom image can be sent to the software application 520, which generates an NFT 530, including the custom image, and delivers it to the user device 510.

Furthermore, the NFT 530 may be committed to a blockchain ledger 528 with an identifier of an owner of the NFT 530, such as a user identifier of the owner of the user device 510. The NFT 530 may be recorded via execution of a blockchain transaction on the blockchain ledger 528 by a plurality of peers (not shown). In addition to the owner's identifier, the conditions necessary for transferring the NFT 530 or portions of the NFT 530 may be committed to the blockchain ledger 528 and used by the peers to manage exchanges of the NFT 530.

Figure 5B:
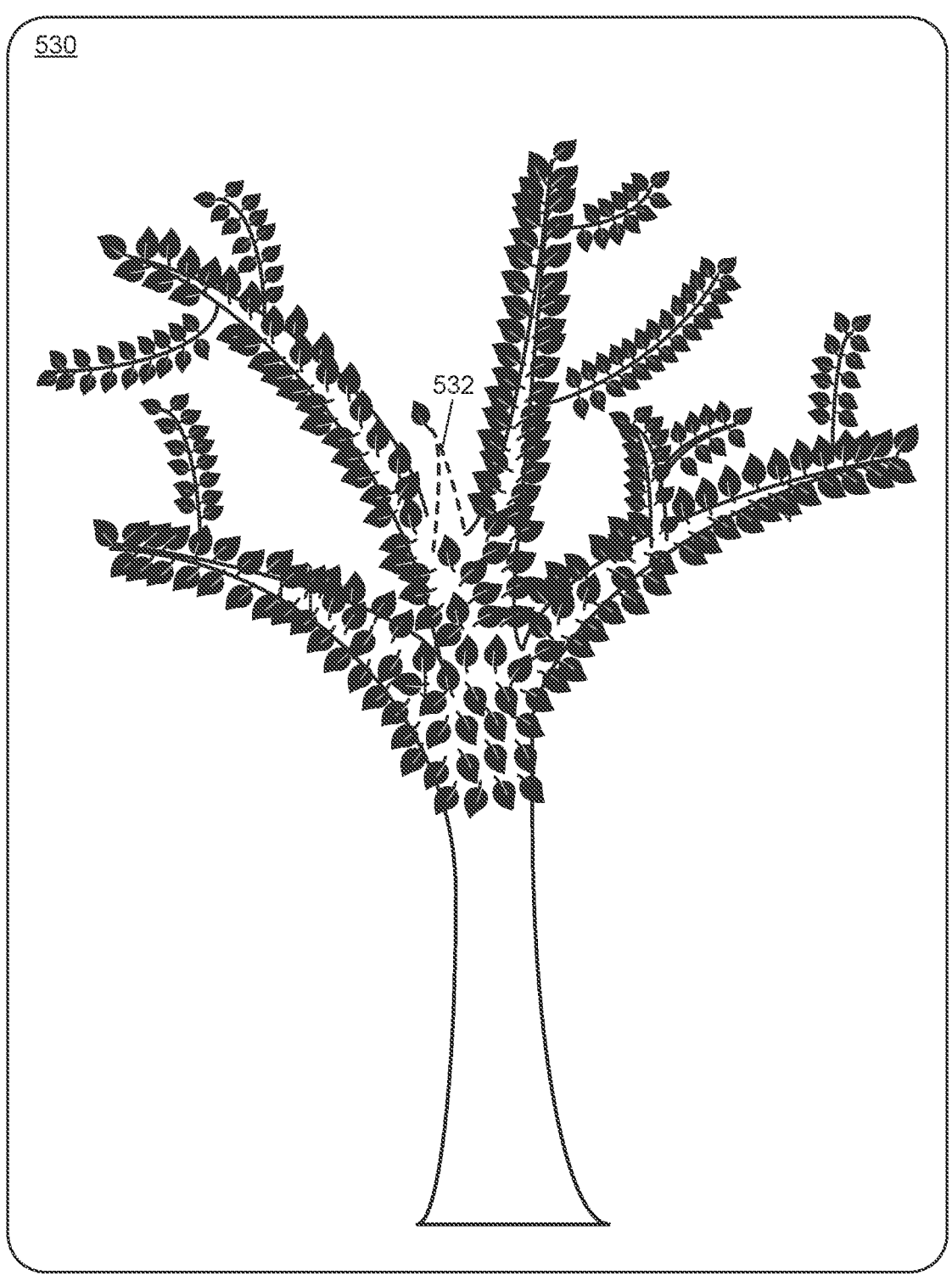

According to various embodiments, the software application 520 may generate the NFT 530 in response to an initial request from the user device 510. The NFT 530 may include an image of an object, such as a tree. When the user opens a new feature within the software application 520, for example, when the user opens a new payment account within the software application 520 for the first time, the software application 520 may trigger the GenAI model 522 to generate a new component/feature for the image. In the example of FIG. 5B, the new portion of the image, is a new branch 532 that starts to grow within the NFT 530. The GenAI model 522 may modify the NFT 530 to include the new branch 532.

Figure 5C:
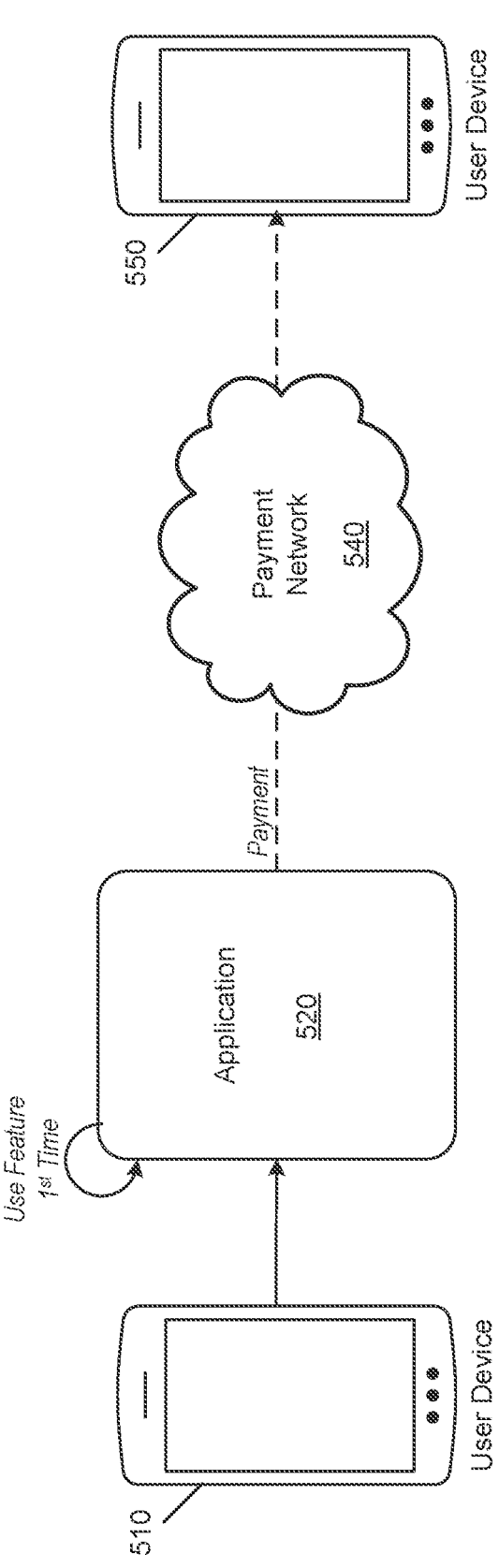

FIG. 5C illustrates a process 560 of the software application 520 monitoring a user account of the user device 510 within the software application 520 and modifying the NFT 530 based on the account activity. For example, the software application 520 may monitor the use of the features of the 520 (e.g., menus, products, downloads, installs, purchases, transactions, etc.) and modify the NFT 530 to show the user the visual result of their account activity. For example, suppose the user uses the new payment account to send payment to another user (e.g., user device 550 in FIG. 5C) via a payment network 540. In that case, the software application 520 may detect this change and notify the GenAI model 522. In response, the GenAI model 522 may update/modify the NFT 530.

Figure 5D:
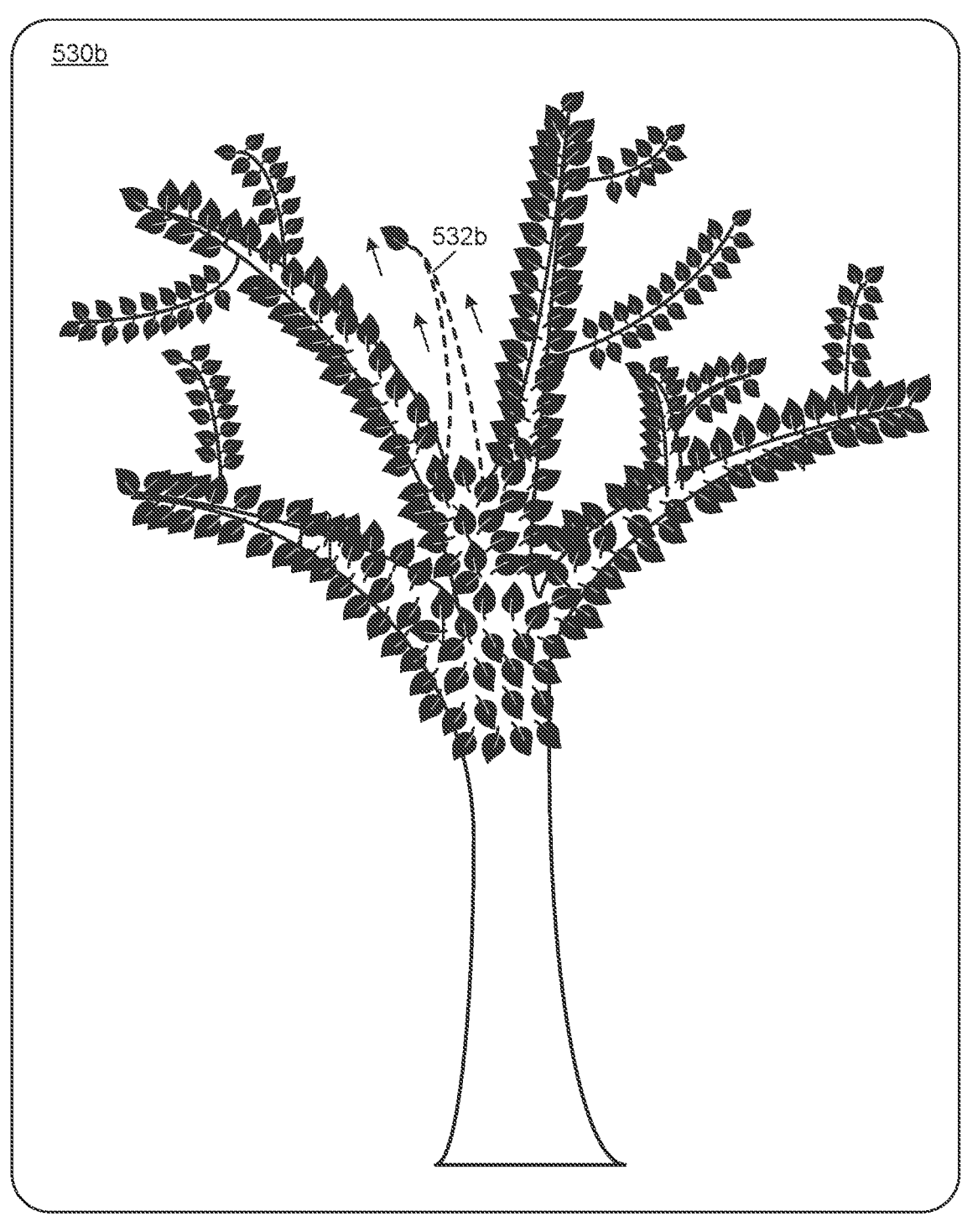

For example, in FIG. 5D, a modified NFT 530b is generated by generating a modified branch 532b, which is generated by modifying/growing the new branch 532 into a larger form. By growing the new branch 532 and causing the branch to grow into the modified branch 532b, the user is visually notified of the additional use of their account. For example, as shown in FIG. 5D, the new branch 532 grows upward, causing the object (money tree) to grow larger.

Figure 6A:
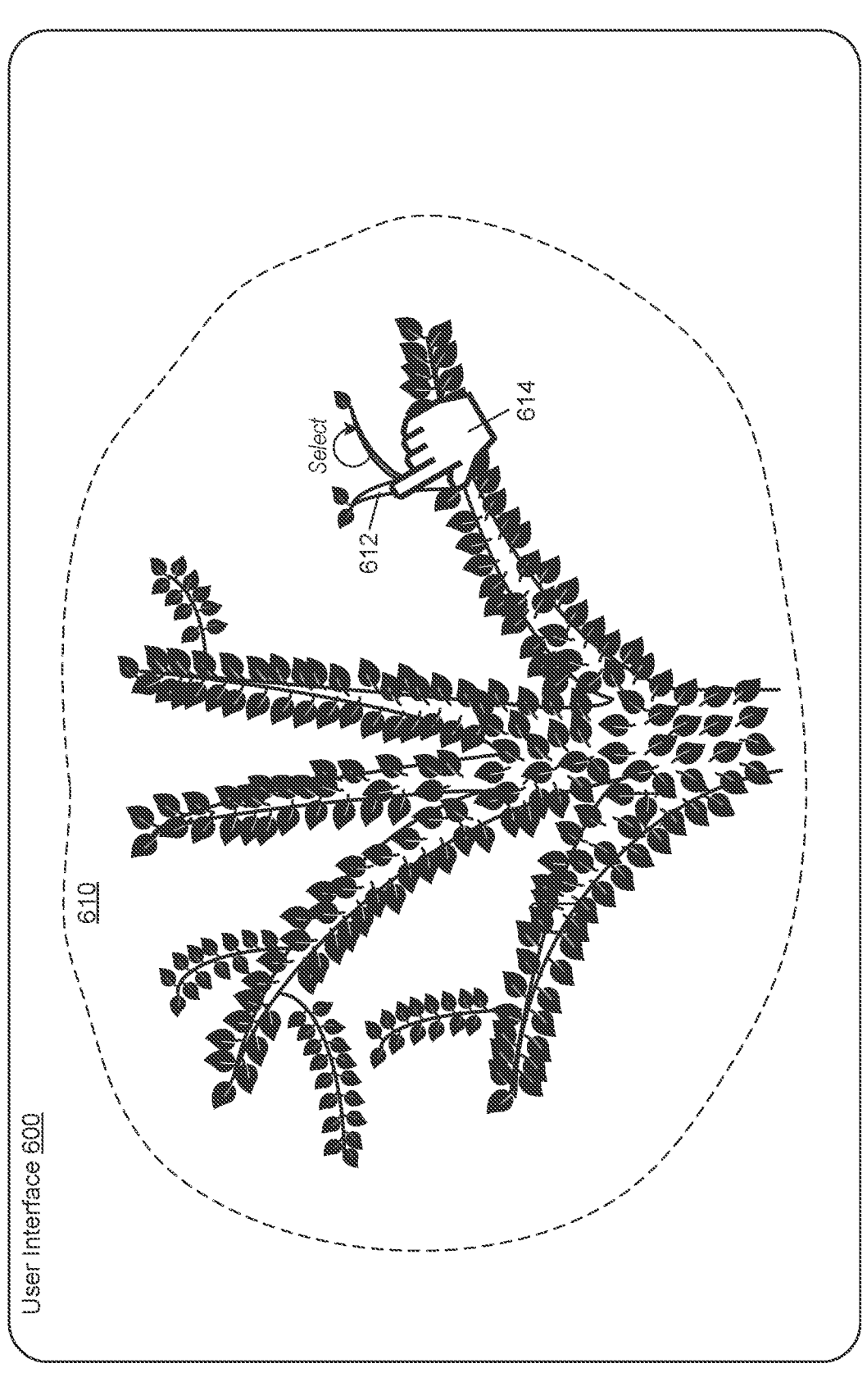

FIGS. 6A-6D illustrates a process of dynamically evolving an image based on progress towards a goal according to example embodiments. For example, FIG. 6A illustrates a process of interacting with an NFT 610 via a user interface 600 of a software application to assign a goal to an image segment within an NFT. Here, an image segment includes a portion of the NFT but not the entire NFT. Referring to FIG. 6A, the NFT 610 may be viewed on a display screen of a user device via the user interface 600, which may be embedded within a mobile application, a browser, or the like. Here, the user may use a cursor 614 (or other input means such as a finger, stylus, etc.) to select an image segment from a plurality of image segments within the NFT 610. In this example, the user has selected a branch 612 on the tree within the NFT 610 via the cursor 614.

Figure 6B:
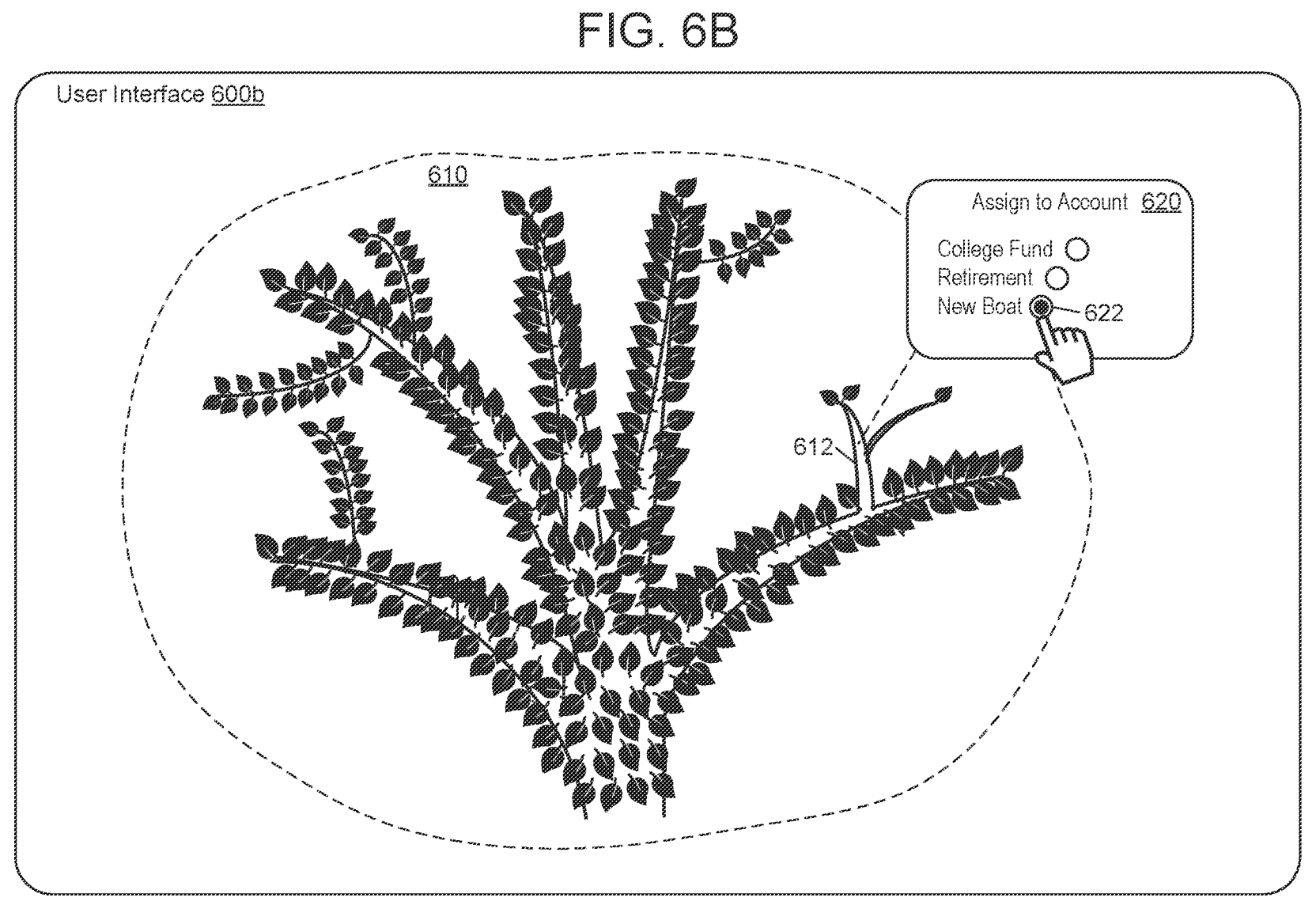

In response to the selection of branch 612, a menu 620 may be displayed, creating a modified user interface 600b, as shown in FIG. 6B. Referring to FIG. 6B, the menu 620 includes a plurality of controls/UI elements for selecting one or more goals to assign to the image segment selected in FIG. 6A (the branch 612). Here, the user selects goal 622 and assigns it to branch 612 (i.e., the image segment) of the NFT 610, creating a modified user interface 600b. In this example, goal 622 is previously mapped to the user's bank account/sub-account. As such, the progress towards the goal can be monitored by monitoring the bank account/sub-account of the user.

For example, FIG. 6C illustrates process 650 of monitoring the user's progress towards goal 622. Here, the software application 630 can monitor an account balance of the user within account data stored in the account data database 626. For example, the software application 630 may monitor the account/sub-account assigned to the goal 622. If the account balance goes up, the software application 630 will determine that the user is getting closer to goal 622. In response, the software application 630 can trigger a GenAI model 632 to modify the NFT 610 to generate a modified NFT 610b. For example, the GenAI model 632 may ingest images and other data from an image repository 634, ingest account data from an account database 636, and use the ingested data to generate the modified NFT 610b. As another example, if the user gets farther from their goal, the GenAI model 632 may reduce the size of the NFT 610, etc. The modified NFT 610b can then be sent to a user device 640 of the user.

Figure 6D:
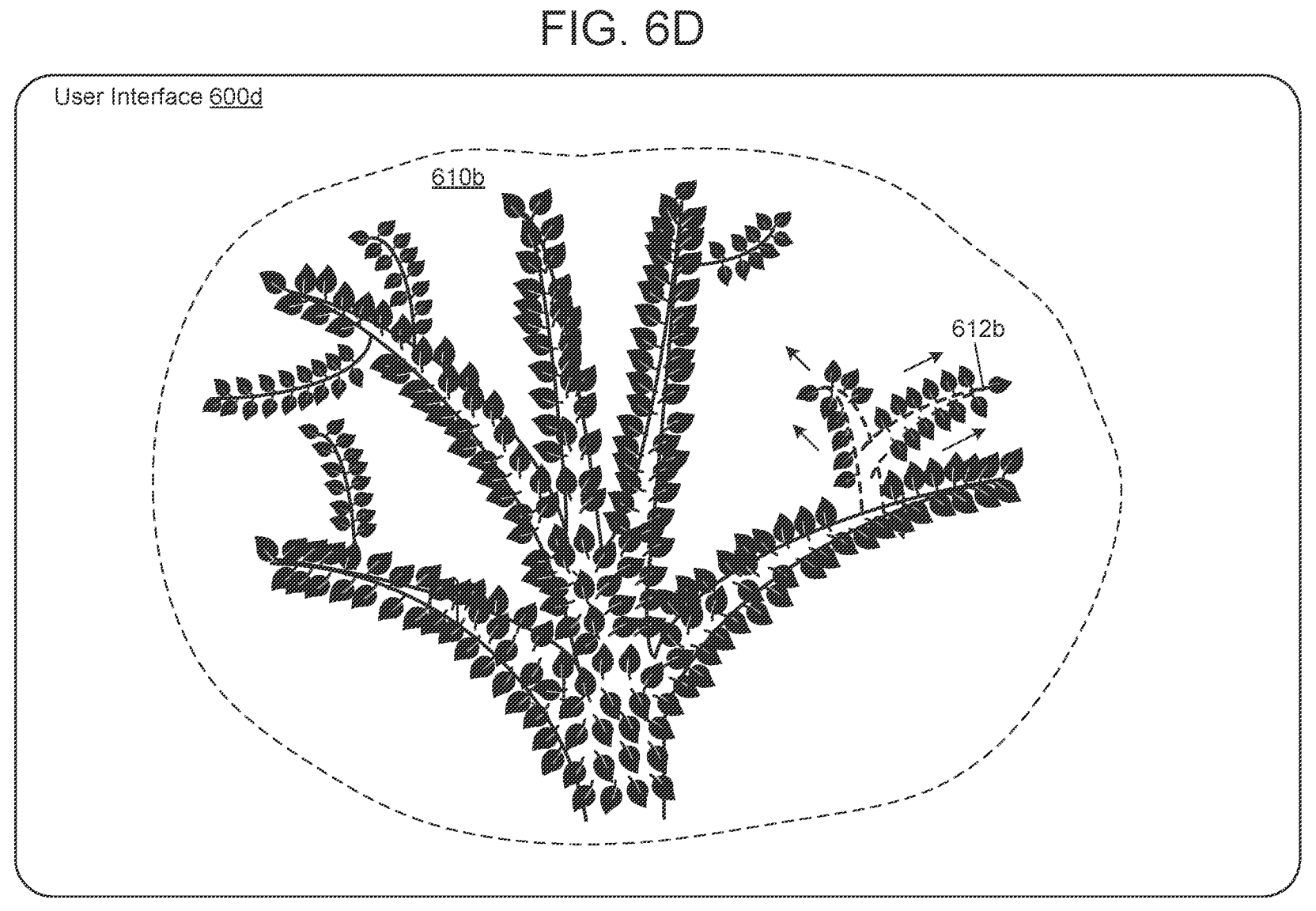

FIG. 6D illustrates a process of generating a modified NFT 610b by modifying a size of the image segment assigned to goal 622. In this example, the GenAI model modifies a size of the branch 612 shown in FIG. 6A to generate a modified branch 612b, as shown in FIG. 6D and refreshes it on the screen, creating a modified user interface 600d.

The modified branch 612b may increase in size via a played animation that shows the branch getting larger over time/animated. As another example, the modified branch 612b may replace/refresh the original NFT sent to the user. For example, the software application 630 may cause the screen to refresh and the modified NFT 610b to be displayed.

FIG. 7A-7D illustrates transferring a portion of an NFT to another user account according to example embodiments.

Figure 7A:
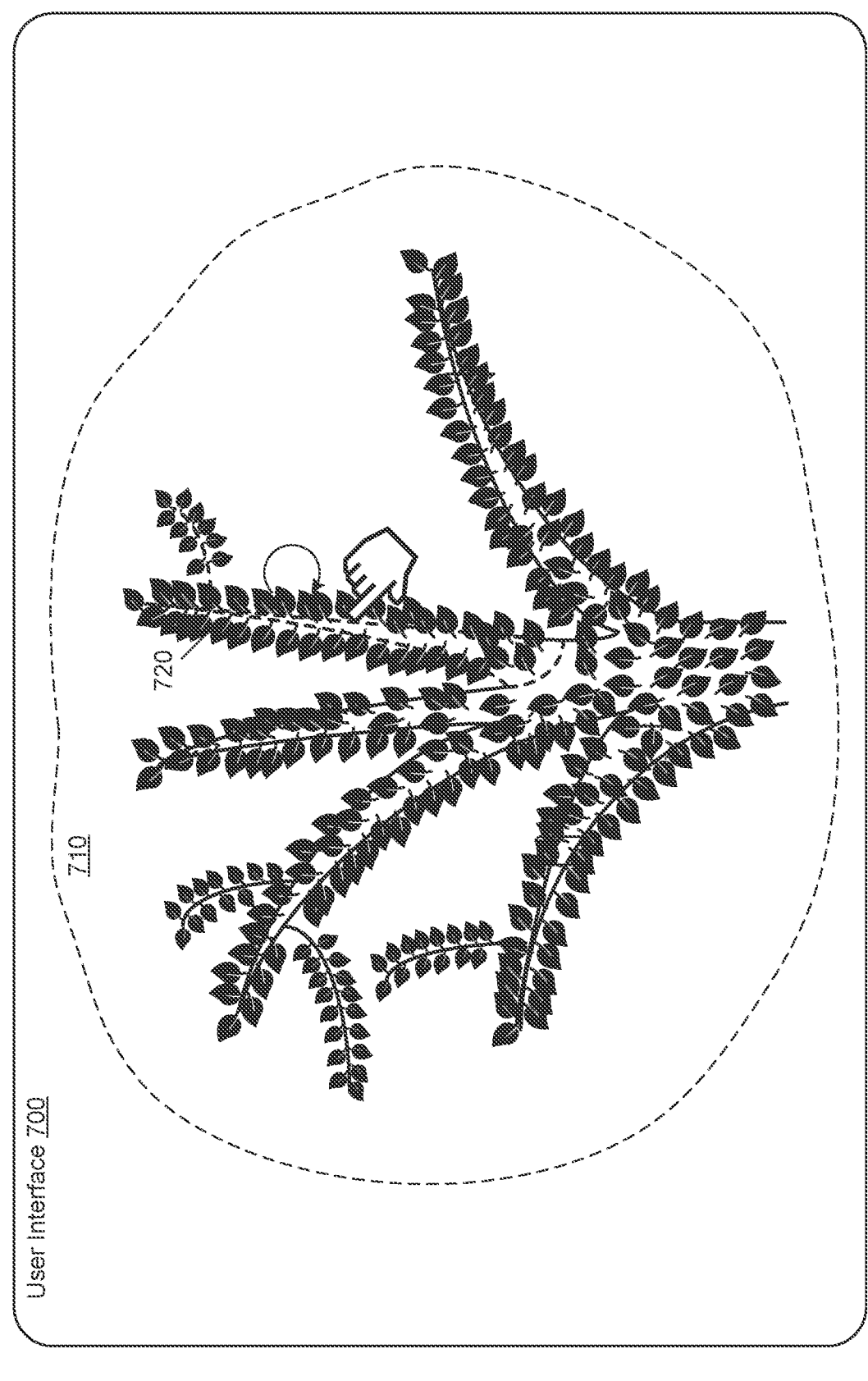

Referring to FIG. 7A, a user interface 700 is shown, including a display of an NFT 710. Here, the user may use a pointer, finger, etc., and touch on the user interface 700 (e.g., on a user device, etc. where the user interface 700 is being displayed) and select an image segment 720 of the NFT 710.

For example, the user may click on or select the image segment 720. The instructions/conditions for selecting an image segment from the NFT 710 may be recorded in a smart contract 780 installed on a blockchain ledger 752 of a blockchain network 750 (shown in FIG. 7D).

Figure 7B:
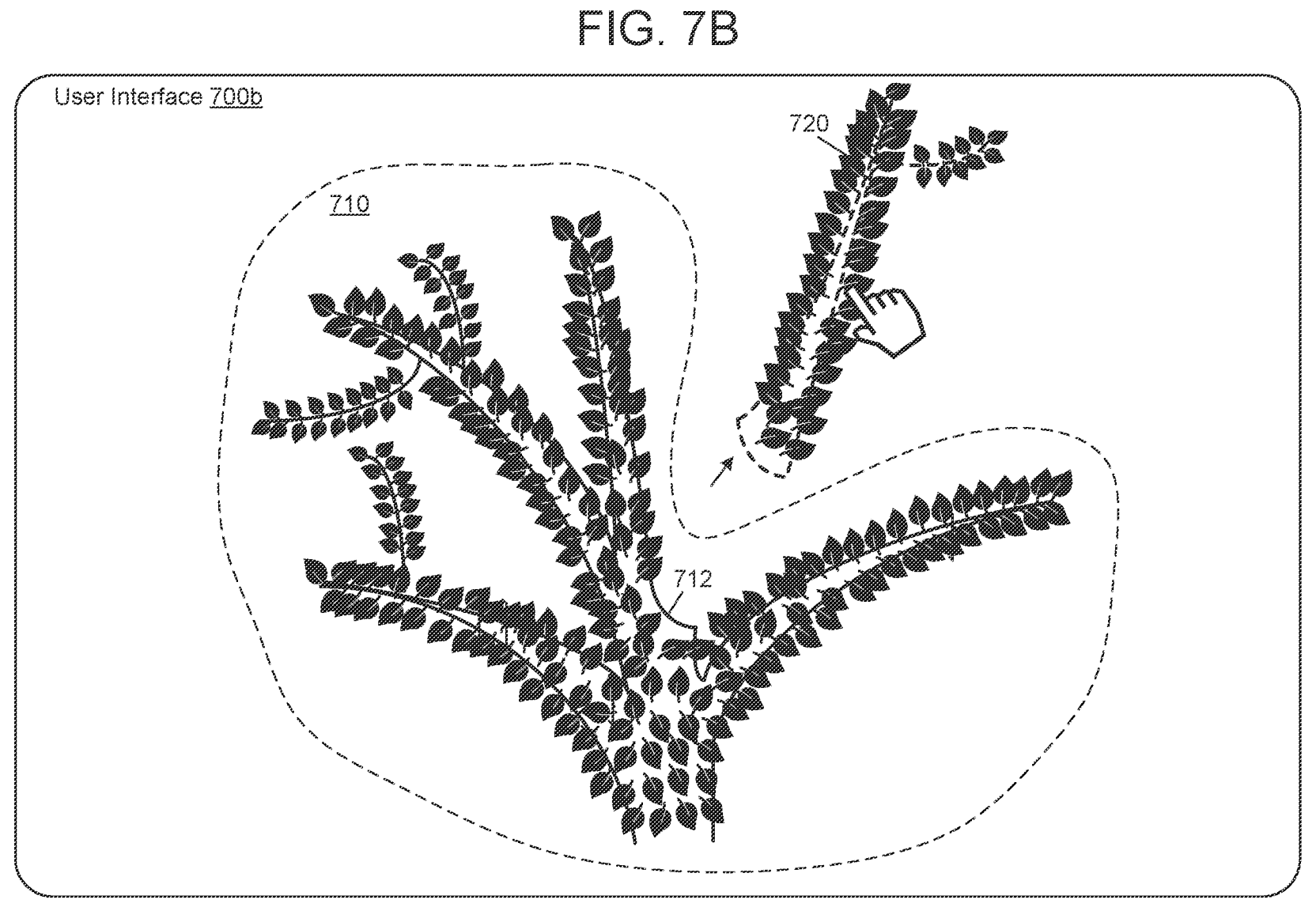

For example, the instructions within the smart contract 780 may include the commands that must be entered on the user interface 700 to cause the image segment 720 to "detach" from the NFT 710 to generate a modified user interface 700b as shown in FIG. 7B. In this example, the image segment 720 has been removed from the NFT 710, resulting in a modified edge 712 within the NFT 710. The image segment 720 can now be transferred to another user account. Here, the image segment 720 is physically moved out of the NFT 710 by a GenAI model.

Figure 7C:
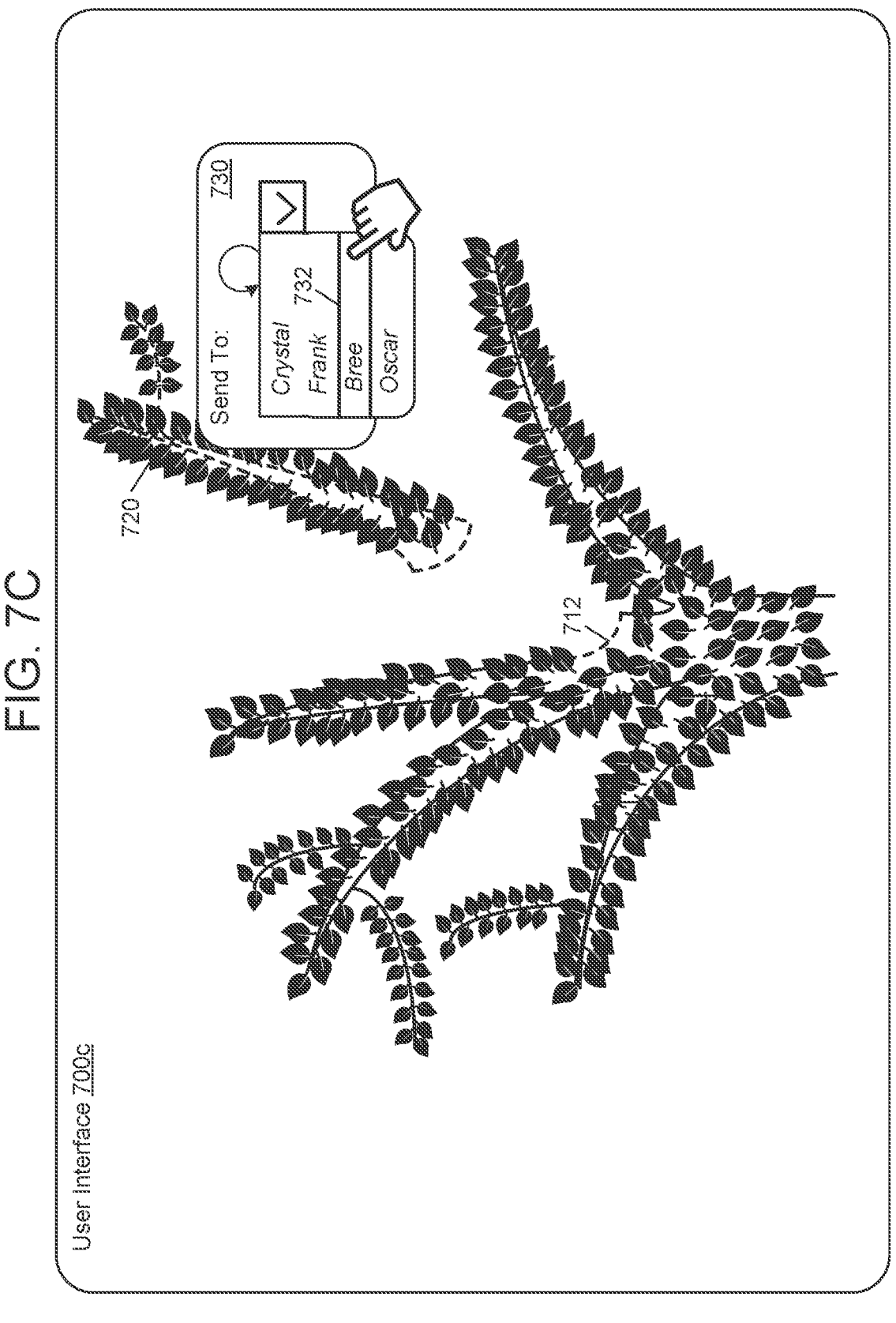

Referring now to FIG. 7C, the user may click on the image segment 720, causing a window 730 to be displayed and a modified user interface 700c to be generated. For example, window 730 may automatically be displayed when the user selects the image segment 720. Here, window 730 includes a menu 732 with a list of users/contacts to which the image segment 720 can be transferred.

In this example, the user can scroll through the menu 732 and use the cursor or other input means to select another/different user and send the image segment 720 to the user.

Figure 7D:
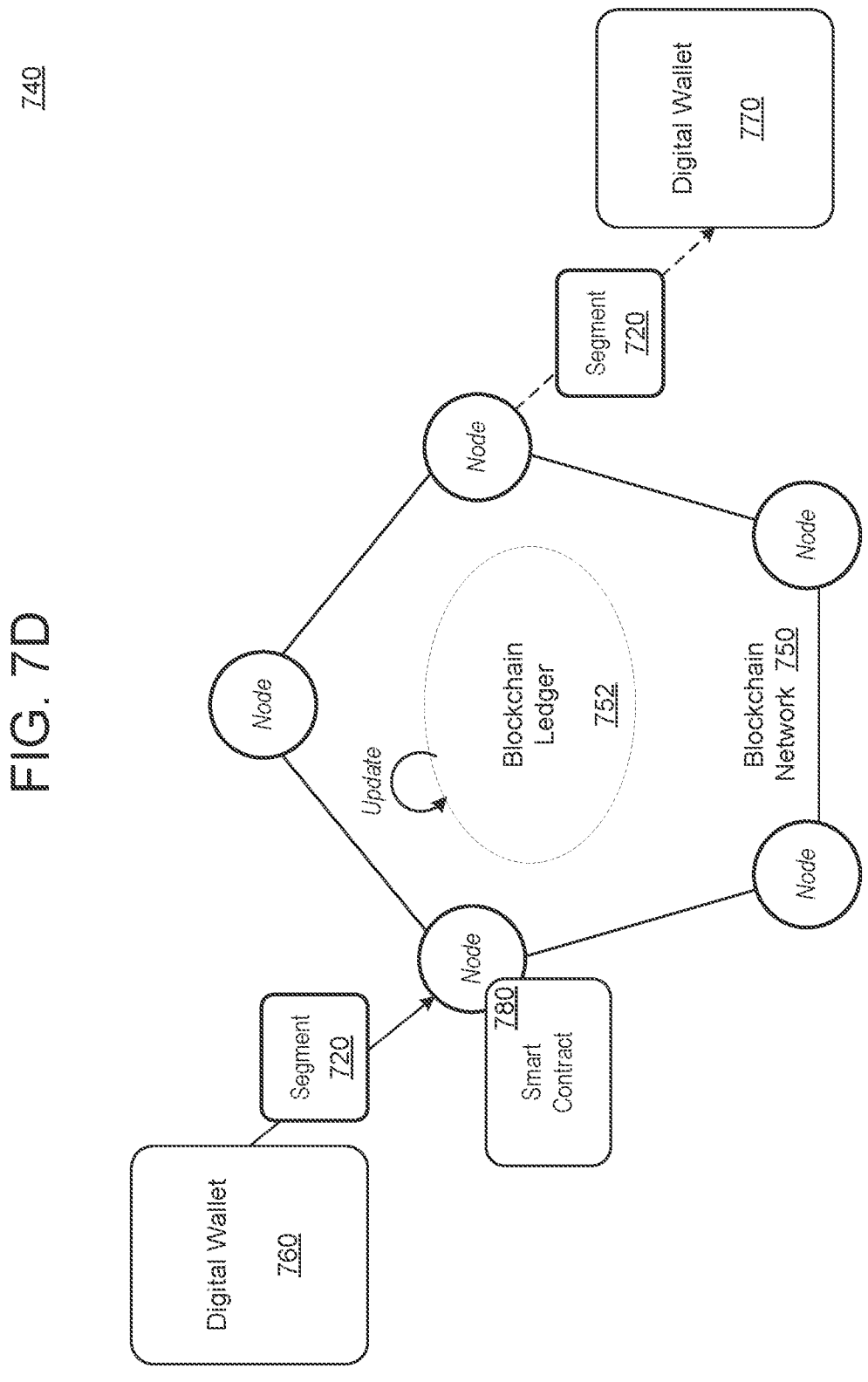

FIG. 7D illustrates a process 740 of transferring the image segment 720 from the NFT 710 shown in FIG. 7A, to a digital wallet 770 of the selected user. In this example, the owner of the NFT 710 owns a digital wallet 760. The digital wallet 760 can transfer the image segment 720 to the digital wallet 770 of the different users via a blockchain network 750. In this example, the digital wallet 760 is assigned a first address of the blockchain network 750, and the digital wallet 770 is assigned a second address of the blockchain network 750. To send the image segment 720 from the digital wallet 760 to the digital wallet 770, the blockchain network 750 transfers the image segment 720 from the blockchain network's first address to the blockchain network's second address.

Here, the blockchain network 750 is managed by a plurality of peer nodes.

Each node may include a smart contract 780 installed, which manages the conditions necessary for detaching and transferring an image segment 720. To transfer the image segment 720, a blockchain transaction may be executed among the peer nodes of the blockchain network 750, causing the image segment 720 to be committed to the blockchain ledger 752 along with an identifier of the new owner, an identifier of the image segment, and the like. The identifier of the new owner may be the blockchain address (public key) of the digital wallet 770. The identifier of the image segment may be an arbitrary identifier assigned by the software to the image segment.

Figure 8A:
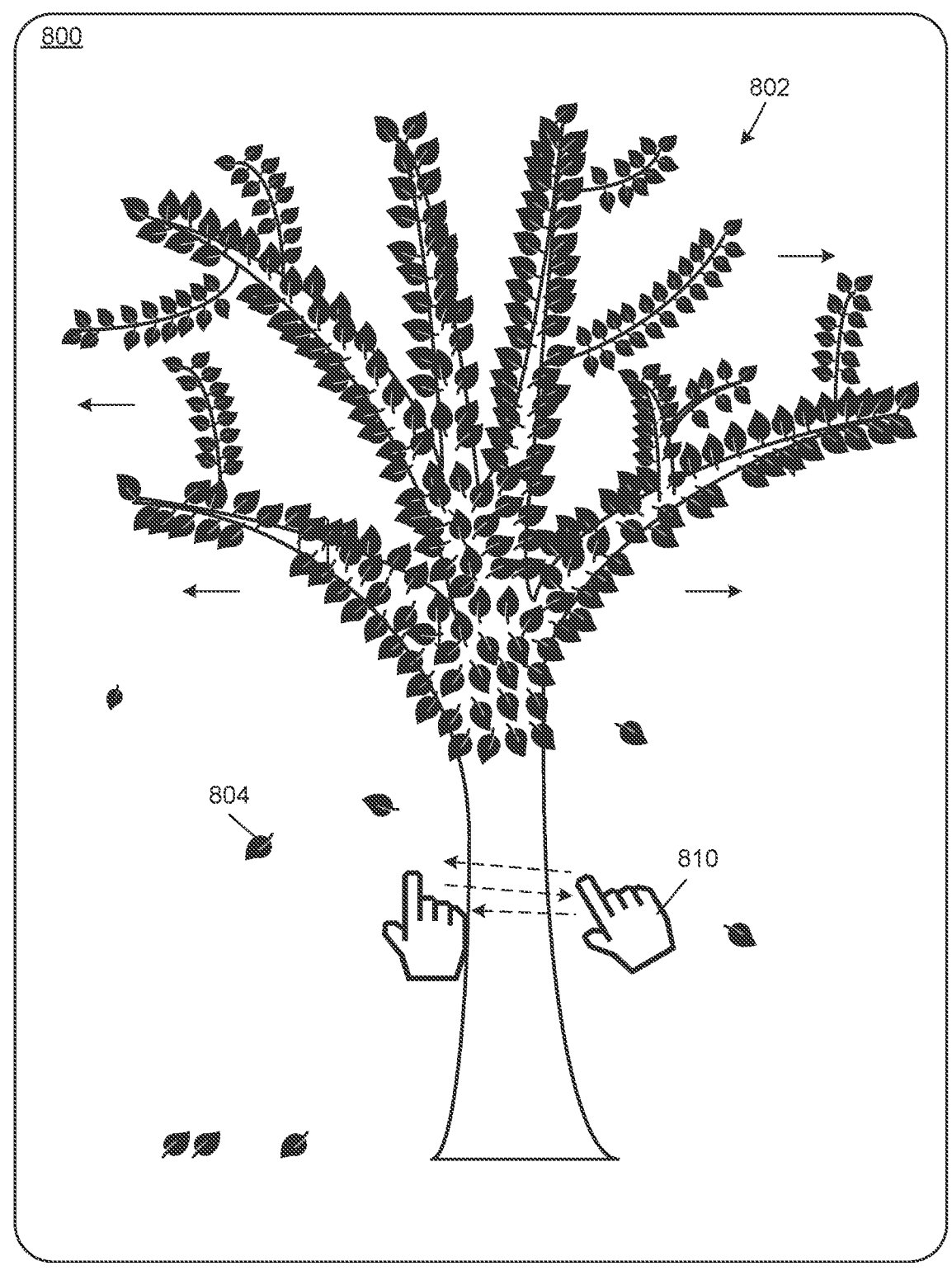
FIGS. 8A-8B are diagrams illustrating a process of releasing an image segment from an NFT based on user interaction and collecting the image segment according to example embodiments.
Figure 8B:
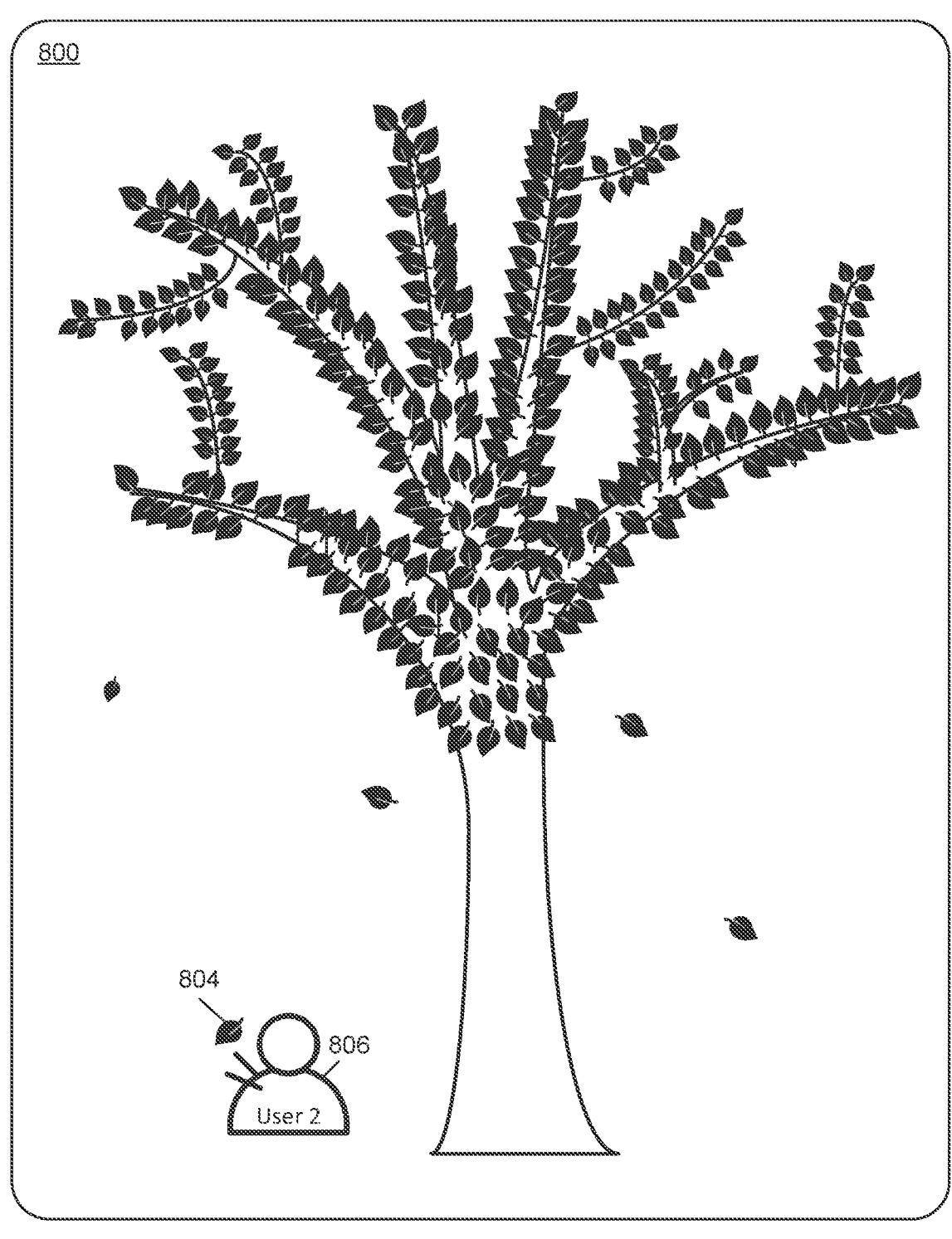

FIGS. 8A-8B illustrates a process of releasing an image segment from an NFT based on user interaction and collecting the image segment according to example embodiments. For example, referring to FIG. 8, a user interface 800 includes an image of an NFT 802 that is being displayed therein. In particular, the NFT 802 includes an image of a tree. Here, the user interface 800 may depict a virtual world where other users (e.g., digital avatars, etc.) can interact with the NFT 802, including picking up content/image segments released therefrom.

In the example of FIG. 8A, the user may use a cursor 810 or other input mechanism and enter a command that causes the tree to shake or otherwise move around and release a portion of its content (e.g., branches, leaves, etc.). For example, the user may cause the tree to shake by moving the cursor 810 back and forth across the screen, causing the NFT 802 to shake and the leaves to fall. For example, a leaf 804 can fall from the tree.

Referring now to FIG. 8B, a different user (represented by avatar 806) may capture the leaf 804 that has fallen from the tree.

The avatar 806 may use an input mechanism to pick up or catch an image segment released from an NFT owned by another user. In response, the software may detect the image segment picked up and execute a blockchain transaction to transfer the image segment from the original user to the different user owning the avatar 806. Thus, a portion of the money tree can be given to another user via the blockchain ledger.

FIG. 9A illustrates method 900 of generating a software test case using GenAI according to example embodiments. For example, method 900 may be performed by a host platform such as a web server, cloud platform, on-premises server, or the like. Referring to FIG. 9A, in 901, the method may include generating an image of an object based on execution of a generative artificial intelligence (GenAI) model and displaying the image via a software application's user interface. In 902, the method may include receiving inputs via the user interface. In 903, the method may include determining that a user account has activated a new feature of the software application based on the received inputs. In response to the detected activation of the new feature, in 904, the method may include adding additional content to the image of the object based on execution of the GenAI model on information associated with the new feature and refreshing a display of the image of the object within the user interface of the software application.

In some embodiments, the method may include extracting a corpus of images of objects from a data source and executing the GenAI model on the corpus of objects to train the GenAI model to generate the image. In some embodiments, the generating the image may include generating a non-fungible token (NFT) that includes the image of the object based on execution of the GenAI model and a blockchain smart contract.

In some embodiments, the generating may include installing the blockchain smart contract on a blockchain ledger and writing an identifier of the user and an identifier of the NFT within the blockchain smart contract.

In some embodiments, the adding the additional content may include determining an amount of content to add to the object based on execution of the GenAI model on an identifier of the new feature that is activated. In some embodiments, adding the additional content may include determining a new component for the object and playing an animation within the software application's user interface, which shows the new component growing on the object. In some embodiments, the GenAI model may include a generative adversarial network (GAN) with a deconvolutional neural network configured to generate images and a convolutional neural network configured to classify the generated images as fake or real images. In some embodiments, the image of the object may include an image of a tree, and the addition of additional content comprises adding one or more of a new branch and a new leaf to the image of the tree based on execution of the GenAI model.

Figure 9B:
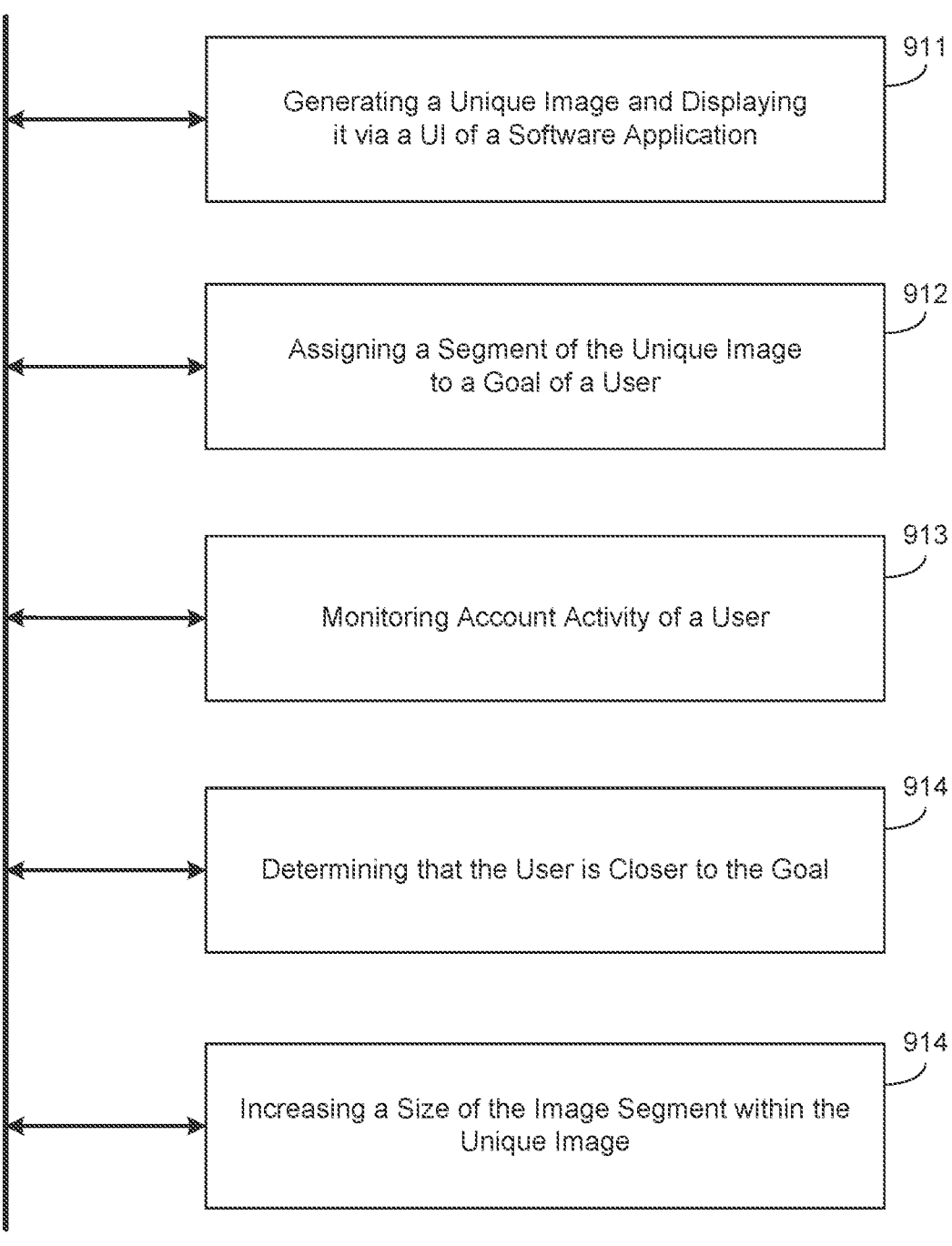
FIG. 9B is a diagram illustrating a method of generating an automation script for executing a software test according to example embodiments.

FIG. 9B illustrates method 910 of generating an automation script for executing a software test according to example embodiments. Referring to FIG. 9B, in 911, the method may include generating a unique image based on the execution of an image-generating model and displaying the unique image via a software application's user interface. In 912, the method may include assigning a segment of the unique image to a goal at a first point in time based on user inputs via a user interface of the software application. In 913, the method may include monitoring a user's account activity within the software application. In 914, the method may include determining, at a second point in time, that the user is closer to the goal based on the monitored account activity of the user within the software application. In 915, in response to the determination, the method may include increasing a size of the segment of the unique image assigned to the user's goal.

In some embodiments, the assigning may include assigning a first image segment to the goal and assigning a second image segment to a different goal. The increasing comprises increasing the size of only the first image segment in response to determining that the user is closer to the goal. In some embodiments, the assigning may further include assigning a payment account of the user to the goal via the software application at the first point in time based on the user inputs via the user interface. In some embodiments, the monitoring may include detecting an increase in an account balance of the payment account of the user at the second point in time and increasing the size of the segment of the unique image based on a difference between the account balance of the payment account at the first point in time and the account balance of the payment account at the second point in time.

In some embodiments, the image-generating model comprises a generative adversarial network (GAN), and the generating the unique image comprises generating a non-fungible token (NFT) that includes the unique image on execution of the GAN and a blockchain smart contract. In some embodiments, the generating may include installing the blockchain smart contract on a blockchain ledger and writing an identifier of the user, an identifier of the segment, and an identifier of the goal assigned to the segment within the blockchain smart contract. In some embodiments, the unique image of the object may include an image of a tree, and the increasing the size of the segment of the unique image assigned to the goal comprises increasing a size of one or more of a branch and a leaf within the image of the tree.

Figure 9C:
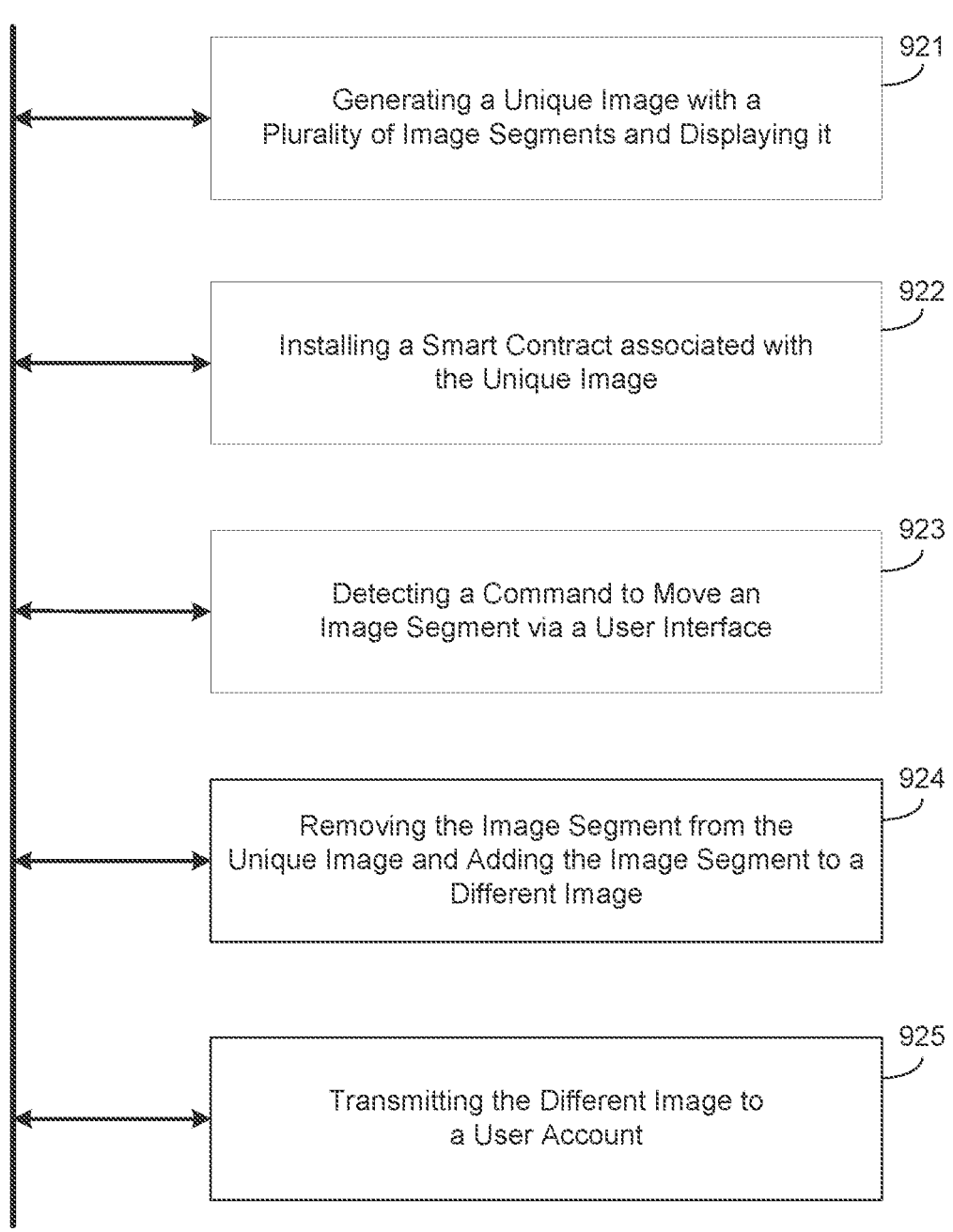
FIG. 9C is a diagram illustrating a method of training a large language model to understand software test cases and automation scripts according to example embodiments.

FIG. 9C illustrates method 920 of training a large language model to understand software test cases and automation scripts according to example embodiments. Referring to FIG. 9C, in 921, the method may include generating a unique image comprising a plurality of image segments via an image-generating model and displaying the unique image via a software application's user interface. In 922, the method may include installing a smart contract associated with the unique image on a blockchain ledger. In 923, the method may include detecting a command to move an image segment from among the plurality of image segments based on user inputs via the software application's user interface. In 924, the method may include removing the image segment from the unique image and adding the image segment to a different image based on the detected command. In 925, the method may include transmitting the different image to a user account of the software application.

In some embodiments, the image-generating model may include a generative adversarial network (GAN), and the generating the unique image comprises generating a non-fungible token (NFT) that includes the unique image based on the execution of the GAN on a corpus of images. In some embodiments, the installing the smart contract may include writing an identifier of the NFT and an identifier of a condition that must occur before the image segment can be moved within the NFT into the blockchain smart contract. In some embodiments, the detecting may include detecting a selection of the image segment based on a touch input on the image segment within the user interface of the software application, and the adding may include adding the image segment to the different image based on a second touch input on an identifier of a user associated with the different image.

In some embodiments, the method may include executing a blockchain transaction via the blockchain ledger to transfer value from an owner of the unique image account to the software application's user account via a plurality of blockchain peer of a blockchain network of the blockchain ledger.

In some embodiments, the detecting the command may include detecting a movement of a different portion of the unique image based on the user inputs via the user interface of the software application, and the removing may include removing the image segment from the unique image in response to the detected movement of the different portion of the unique image. In some embodiments, the method may include writing an identifier of the image segment and an identifier of the user account as an owner of the image segment within the blockchain smart contract based on the detected command. In some embodiments, the unique image may include an image of a tree, and the removing the image segment may include removing one or more of a branch and a leaf within the image of the tree.

FIG. 9D illustrates method 930 of identifying a vulnerability in a software program and generating a fix according to example embodiments.

Referring to FIG. 9D, in 931, the method may include generating a dynamically modifiable image comprising a plurality of interconnected content via an image-generating model and displaying the dynamically modifiable image via a software application's user interface. In 932, the method may include installing a smart contract that includes an identifier of an owner of the dynamically modifiable image on a blockchain ledger. In 933, the method may include detecting removal of a piece of content from among the plurality of pieces of interconnected content based on user inputs via the user interface. In 934, the method may include detecting addition of the removed piece of content to a different dynamically-modifiable image of a different user. In response to the detected addition, in 935, the method may include executing an electronic payment transaction to transfer value from the owner of the dynamically modified image to the different user based on the smart contract installed on the blockchain ledger.

In some embodiments, the detecting may include detecting a sequence of touch inputs on the user interface of the software application via a first user device and, in response, detaching the piece of content from the plurality of pieces of interconnected content and moving the detached piece of content to a different location within the dynamically-modifiable image. In some embodiments, the image-generating model may include a generative adversarial network (GAN), and the generating the unique image comprises generating a non-fungible token (NFT) that includes the unique image based on the execution of the GAN on a corpus of images. In some embodiments, the installing the smart contract may include writing conditions for removing the piece of content into the smart contract, wherein the conditions comprise identifiers of user interface commands with respect to the dynamically modifiable image.

In some embodiments, the method may further include executing a blockchain transaction via the blockchain ledger to transfer value from an account associated with the dynamically modified image to an account of the different user via a plurality of blockchain peers of a blockchain network of the blockchain ledger.

In some embodiments, executing may include transferring a digital asset from an address of a digital wallet of the account associated with the dynamically modifiable image to an address of a digital wallet of the different user's account via the blockchain ledger. In some embodiments, the method may include writing an identifier of the content added to the different dynamically-modifiable image and an identifier of the different user account within the blockchain smart contract. In some embodiments, the dynamically modifiable image may include an image of a tree, and the detecting the removal of the piece of content comprises detecting removal of one or more of a branch of the tree and a leaf of the tree within the image of the tree based on user inputs received via the user interface.

The above embodiments may be implemented in hardware, a computer program executed by a processor, firmware, or a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 10 illustrates an example computer system architecture, which may represent or be integrated in any of the above-described components, etc.

FIG. 10 illustrates an example system 1000 that supports one or more example embodiments described and/or depicted herein. The System 1000 comprises a computer system/server 1002, which is operational with numerous other general-purpose or special-purpose computing system environments or configurations. Examples of well-known computing systems, environments, and/or configurations that may be suitable for use with computer system/server 1002 include but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in local and remote computer system storage media, including memory storage devices.

As shown in FIG. 10, computer system/server 1002 in the example system 1000 is shown as a general-purpose computing device. The components of computer system/server 1002 may include but are not limited to, one or more processors or processing units (processor 1004), a system memory 1006, and a bus that couples various system components, including the system memory 1006 to the processor 1004.

The bus represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media. The system memory 1006, in one embodiment, implements the flow diagrams of the other figures. The system memory 1006 can include computer system readable media in volatile memory, such as random-access memory (RAM) 1010 and/or cache memory 1012. Computer system/server 1002 may further include other removable/non-removable, volatile/non-volatile computer system storage media. By way of example only, storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 1006 may include at least one program product having a set (e.g., at least one) of program modules that are configured to carry out the functions of various embodiments of the application.

Program/utility 1016, having a set (at least one) of program modules 1018, may be stored in the system memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer-readable medium(s) having computer-readable program code embodied thereon.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via a bus. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Although an exemplary embodiment of at least one of a system, method, and computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application but is intended to provide one example of many embodiments. Indeed, methods, systems, and apparatuses disclosed herein may be implemented in localized and distributed forms consistent with computing technology.

It should be noted that some of the system features described in this specification have been presented as modules to emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, etc.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the application components, as generally described and illustrated in the figures herein, may be arranged and designed in a wide variety of configurations. Thus, the detailed description of the embodiments is not intended to limit the scope of the application as claimed but is merely representative of selected embodiments of the application.

One with ordinary skill in the art will readily understand that the above may be practiced with steps in a different order and/or hardware elements in configurations that are different from those disclosed. Therefore, although the application has been described based on these preferred embodiments, certain modifications, variations, and alternative constructions would be apparent to those of skill in the art.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a memory; and a processor coupled to the memory, the processor configured to:

receive a request with image attributes;

generate an image of an object comprising a plurality of image segments based on execution of an artificial intelligence (AI) model on the image attributes and display the image via a user interface of a software application;

monitor activity within the software application;

detect a newly activated feature in the software application based on the monitored activity; and automatically grow a size of an image segment among the plurality of image segments displayed on the user interface based on an additional execution of the AI model on an identifier of the newly activated feature.

2. The apparatus of claim 1, wherein the processor is configured to assign a first image segment of the object to a goal, assign a second image segment of the object to a different goal, and increase a size of the first image segment based on the goal being closer to being completed.

3. The apparatus of claim 1, wherein the processor is configured to assign a profile to the image segment via the software application based on inputs via the user interface.

4. The apparatus of claim 3, wherein the processor is configured to detect an increase in a balance within the profile based on the monitored activity, and increase the size of the image segment based on an amount of the increase of the balance.

5. The apparatus of claim 1, wherein the AI model comprises a generative adversarial network (GAN), and the processor is configured to generate a non-fungible token (NFT) that includes the image based on execution of the GAN and a smart contract.

6. The apparatus of claim 1, wherein the processor is configured to install a smart contract on a blockchain ledger and write an identifier of the image segment and an identifier of the newly activated feature within the smart contract.

7. The apparatus of claim 1, wherein the image comprises an image of a tree, and the processor is configured to increase a size of at least one of a branch and a leaf within the tree.

8. A method comprising:

receiving a request with image attributes;

generating an image of an object comprising a plurality of image segments based on execution of an artificial intelligence (AI) model on the image attributes and displaying the image via a user interface of a software application;

monitoring activity within the software application;

detecting a newly activated feature in the software application based on the monitored activity; and automatically growing a size of an image segment among the plurality of image segments displayed on the user interface based on an additional execution of the AI model on an identifier of the newly activated feature.

9. The method of claim 8, further comprising assigning a first image segment of the object to a goal and assigning a second image segment of the object to a different goal, and increasing a size of the first image segment of the object based on the goal being closer to being completed.

10. The method of claim 8, wherein the assigning further comprises assigning a profile to the image segment via the software application based on inputs via the user interface.

11. The method of claim 8, wherein the AI model comprises a generative adversarial network (GAN), and the generating the image comprises generating a non-fungible token (NFT) that includes the image on execution of the GAN and a smart contract.

12. The method of claim 8, wherein the generating further comprises installing a smart contract on a blockchain ledger and writing an identifier of the image segment and an identifier of the newly activated feature within the smart contract.

13. The method of claim 8, wherein the image comprises an image of a tree, and the growing comprises increasing a size of at least one of a branch and a leaf within the tree.

14. The method of claim 8, wherein the growing comprises growing a detachable portion of the object within the image segment based on the newly activated feature.

15. The method of claim 8, further comprising embedding the image within a non-fungible token (NFT) and committing the NFT to an address of a blockchain ledger associated with a digital wallet of the software application.

16. A computer-readable medium comprising instructions stored therein which when executed by a processor cause a computer to perform:

receiving a request with image attributes;

generating an image of an object comprising a plurality of image segments based on execution of an artificial intelligence (AI) model on the image attributes and displaying the image via a user interface of a software application;

monitoring activity within the software application;

detecting a newly activated feature in the software application based on the monitored activity; and automatically growing a size of an image segment among the plurality of image segments displayed on the user interface based on an additional execution of the AI model on an identifier of the newly activated feature.

17. The computer-readable medium of claim 16, wherein the processor is further configured to perform assigning a first image segment of the object to a goal and assigning a second image segment of the object to a different goal, and increasing a size of the first image segment of based on the goal being closer to being completed.

18. The computer-readable medium of claim 16, wherein the assigning further comprises assigning a profile to the image segment via the software application based on inputs via the user interface.

19. The computer-readable medium of claim 16, wherein the AI model comprises a generative adversarial network (GAN), and the generating the image comprises generating a non-fungible token (NFT) that includes the image on execution of the GAN and a blockchain smart contract.

20. The computer-readable medium of claim 16, wherein the generating further comprises installing a smart contract on a blockchain ledger and writing an identifier of the image segment and an identifier of the newly activated feature within the smart contract.

* * * * *